(12) United States Patent
Koo et al.

(10) Patent No.: US 6,937,864 B2
(45) Date of Patent: Aug. 30, 2005

(54) TRANSMISSION APPARATUS AND METHOD FOR MULTIMEDIA SERVICE IN MOBILE COMMUNICATION SYSTEM

(75) Inventors: Chang-Hoi Koo, Songnam-shi (KR); Dong-Seek Park, Suwon-shi (KR); Dae-Gyun Kim, Taegu-Kwangyokshi (KR); Beom-Sik Bae, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 509 days.

(21) Appl. No.: 10/139,736

(22) Filed: May 6, 2002

(65) Prior Publication Data

US 2002/0193106 A1 Dec. 19, 2002

(30) Foreign Application Priority Data

May 4, 2001 (KR) ................................. 10-2001-0024470
May 4, 2001 (KR) ................................. 10-2001-0024467

(51) Int. Cl.[7] ............................. H04B 7/00; H04Q 7/00
(52) U.S. Cl. ..................... 455/452.1; 455/512; 455/69; 455/67.13; 370/441; 370/342
(58) Field of Search ............................. 455/452.1, 512, 455/24, 67.13, 68, 69, 517; 370/390, 329, 232, 235, 441, 342

(56) References Cited

U.S. PATENT DOCUMENTS

| | | | | |
|---|---|---|---|---|
| 5,914,950 A | * | 6/1999 | Tiedemann et al. | 370/348 |
| 6,574,211 B2 | * | 6/2003 | Padovani et al. | 370/442 |
| 6,741,580 B1 | * | 5/2004 | Kim et al. | 370/337 |
| 6,760,576 B2 | * | 7/2004 | Chen | 455/452.2 |
| 6,788,687 B2 | * | 9/2004 | Bao et al. | 370/394 |
| 6,807,426 B2 | * | 10/2004 | Pankaj | 455/453 |
| 2001/0046877 A1 | * | 11/2001 | Ohkubo et al. | 455/503 |
| 2001/0050900 A1 | * | 12/2001 | Lee et al. | 370/232 |
| 2002/0075897 A1 | * | 6/2002 | Koo et al. | 370/466 |
| 2002/0118698 A1 | * | 8/2002 | Koo et al. | 370/441 |
| 2002/0142780 A1 | * | 10/2002 | Airy et al. | 455/452 |
| 2003/0012195 A1 | * | 1/2003 | Ohkubo et al. | 370/390 |

* cited by examiner

*Primary Examiner*—David Hudspeth
*Assistant Examiner*—Kamran Afshar
(74) *Attorney, Agent, or Firm*—Dilworth & Barrese LLP

(57) ABSTRACT

A scheduling method for providing multimedia service and packet data service efficiently. The scheduling is a Round-Robin scheduling in an MQC (Multiple Quality Control) protocol structure. A transmitter in a base station transmits or retransmits TUs from different streams in a PLP using priority queues by the scheduling.

25 Claims, 27 Drawing Sheets

(a) Case I 384bits at 38.4Kbps

| TU0 | or | TU1 | or | TU2 |

(b) Case II 384bits, 768bits at 76.8Kbps

| TU0 | TU1 | or | TU0 | TU2 | or | TU1 | TU2 |

| TU0 | or | TU1 | or | TU2 |

(c) Case III 384bit, 768bit, 1536bits at 153.6Kbps

(1) | TU0 | TU1 | TU2 | or (2) | TU0 | TU1 | TU2 |
(3) | TU0 | TU1 | TU2 | or (4) | TU0 | TU1 |
(5) | TU1 | TU2 | or (6) | TU0 | TU2 |
(7) | TU0 | or (8) | TU1 |
(9) | TU2 |

(1) | TU0 | TU1 | TU2 | or
(2) | TU0 | TU1 | TU2 | or
(3) | TU0 | TU1 | TU2 | or
(4) | TU0 | TU1 | or
(5) | TU0 | TU2 | or
(6) | TU1 | TU2 | or
(7) | TU0 | or
(8) | TU1 | or
(9) | TU2 |

(d) Case IV-1 384bit, 768bits, 1536bits 3072 bits at 307.2Kbps
(d) Case IV-2 768bits, 1536bits 3072 bits at 614.4Kbps
(d) Case IV-3 1536bits 3072 bits at 1228.8Kbps
(d) Case IV-4 3072 bits at 2457.6Kbps

FIG.3

TRANSMISSION APPARATUS AND METHOD FOR MULTIMEDIA SERVICE IN MOBILE COMMUNICATION SYSTEM

PRIORITY

This application claims priority to an application entitled "Initial Transmission and Retransmission Apparatus and Method for Multimedia Service in Mobile Communication System" filed in the Korean Industrial Property Office on May 4, 2001 and assigned Serial No. 2001-24467 and to an application entitled "Initial Transmission and Retransmission Apparatus and Method for Multimedia Service in Mobile Communication System" filed in the Korean Industrial Property Office on May 4, 2001 and assigned Serial No. 2001-24470, the contents of both of which are hereby incorporated by reference.

BACKGROUND OF THE INVENTION

1. Field of the Invention

The present invention relates generally to a data transmission apparatus and method according to a protocol structure in a CDMA (Code Division Multiple Access) communication system, and in particular, to a data transmission apparatus and method that support multimedia service and ensure high data rates in a mobile communication system.

2. Description of the Related Art

In general, a mobile communication system provides both voice service and data service. Such mobile communication systems include IS-2000, HDR (High Data Rate), and 1EXTREME. HDR and 1EXTREME have been proposed by the 1XEV technology of 3GPP. However, the above mobile communication systems are not suitable for multimedia service. Specifically, they cannot optimize a throughput for packet data service.

In the mobile communication systems, data with the same QoS (Quality of Service) requirement is transmitted on the same physical channel. This implies that the mobile communication systems have limitations in providing different QoSs to inter-media and intra-media streams in multimedia service. Therefore, there is a need for proposing a novel mobile communication system that provides different QoSs for different types of services.

SUMMARY OF THE INVENTION

An object of the present invention is, therefore, to provide an effective scheduling apparatus and method in a mobile communication system that employs an MQC (Multiple Quality Control) structure and transmits data on a TU (Transport Unit) basis.

Another object of the present invention is to provide a Round-Robin scheduling-based scheduling apparatus and method in a system that provides multimedia service.

A further object of the present invention is to provide an apparatus and method for combining TUs according to a data rate and data traffic types, for transmission on multiple channels in a base station.

Still another object of the present invention is to provide an apparatus and method for receiving combined TUs on multiple channels and processing them in a mobile station (MS).

Yet another object of the present invention is to provide an apparatus and method for providing a high throughput in high-speed data transmission as well as in data transmission by effective scheduling in a protocol structure that supports multimedia service as well as data service.

The foregoing and other objects of the present invention are achieved by providing an apparatus and method for transmitting different types of service data to an MS.

A transmitter in a base station determines a maximum data size available at a data rate determined from DRC (Data Rate Control) information received from the MS, and constructs transmission data in the maximum available data size by combining one or more types of service data among the different types of service data according to delay sensitivity-based priority levels of the different types of service data.

BRIEF DESCRIPTION OF THE DRAWINGS

The above and other objects, features and advantages of the present invention will become more apparent from the following detailed description when taken in conjunction with the accompanying drawings in which:

FIGS. 3A to 3D illustrate embodiments of combining TUs from M-priority buffers in a PLP in the case of three channel data transmission in a multi-channel structure according to an embodiment of the present invention;

DETAILED DESCRIPTION OF THE PREFERRED EMBODIMENTS

Preferred embodiments of the present invention will be described hereinbelow with reference to the accompanying drawings. In the following description, well-known functions or constructions are not described in detail since they would obscure the invention in unnecessary detail.

Figure 1:
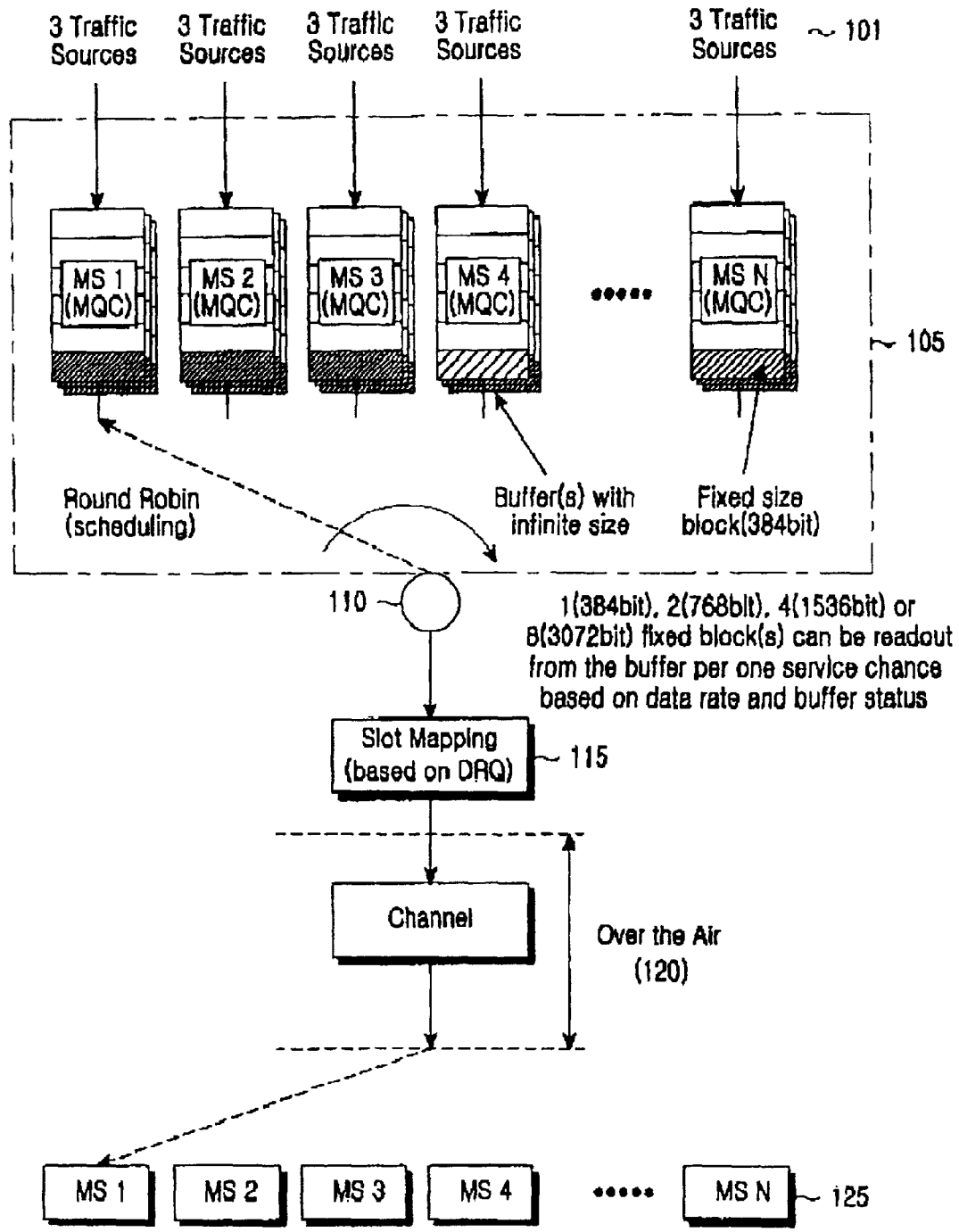
FIG. 1 is a block diagram of a transmitter in a base station, for providing services to MSs within a cell according to an embodiment of the present invention.

FIG. 1 is a block diagram of a transmitter in a base station, for providing services to MSs within the cell according to the present invention. Referring to FIG. 1, reference numeral 101 denotes application service data received in the base station, for transmission to mobile stations. Upon receipt of the application service data, the base station determines the priority levels of the application service data and assigns to buffers the application service data according to the priority levels. It is assumed here that three application services are provided concurrently to each MS. If data from application service arrives in the base station, a single buffer is assigned to a corresponding MS. The data from the three application services for each MS may have the same QoS or different QoSs. The base station can assign preset buffers to the application service data according to their different QoS requirements to appropriately process the application service data.

Reference numeral 105 denotes processing data from the three application services in three buffers assigned to each MS. Each H-priority buffer serves as an MQC channel and thus it can be said that three MQC channels are assigned to each MS. Here, it is to be noted that the description of the present invention is made on the assumption that the base station provides three application services to each MS and thus three buffers are assigned to the MS. The application service data of each H-priority buffer is mapped to a different QM (Quality Matching) value prior to transmission to a corresponding MS. According to a given data rate, one or more TUs are mapped to one PLP (Physical Layer Packet). If 20 MSs exist in the cell, the base station assigns at least 20 buffers to the MSs. If each MS receives data from three application services, it is assigned three buffers. Each application service data is stored in 384-bit TUs with headers and tails in each H-priority buffer. The number of bits read out from each H-priority buffer is determined based on the channel condition between the base station and a corresponding MS and a given data rate.

A server 110 reads out 384-bit TUs from each H-priority buffer by Round-Robin scheduling. Although MSs are scheduled by the Round-Robin scheduling as a whole, if two or more application services are provided to a particular MS, application service data are mapped to PLPs according to their priority levels of the application services. Though the number of TUs read out from each H-priority buffer is different according to a data rate, one, two, four, or eight TUs can be transmitted in one PLP. TU mapping to data rates will be described later.

Reference numeral 115 denotes constructing a PLP with TUs according to a data rate determined from DRQ (Data Rate reQuest) received from an MS and mapping the PLP to slots of a physical channel. The PLP is transmitted in slots of which the number varies according to the data rate and the capacity of a traffic channel. The PLP can be mapped to one, two, four, or eight slots according to the data rate. In other words, the TUs are mapped to 1.25-ms slots according to the PLP size and the data rate. Slot mapping will also be described later.

Reference numeral 120 denotes transmission of the slots. A transmission channel can be modeled as an AWGN (Additive White Gaussian Noise) channel or a fading channel. A detailed description of the channel is avoided here because channel characteristics are beyond the scope of the present invention.

Reference numeral 125 denotes the MSs that receive the application service data from the base station. While the application service data may be transmitted in a different manner in real implementation according to the number of MSs within the cell and the number of application services, the difference is negligible in relation to the whole operation of the transmission apparatus.

Figure 2:
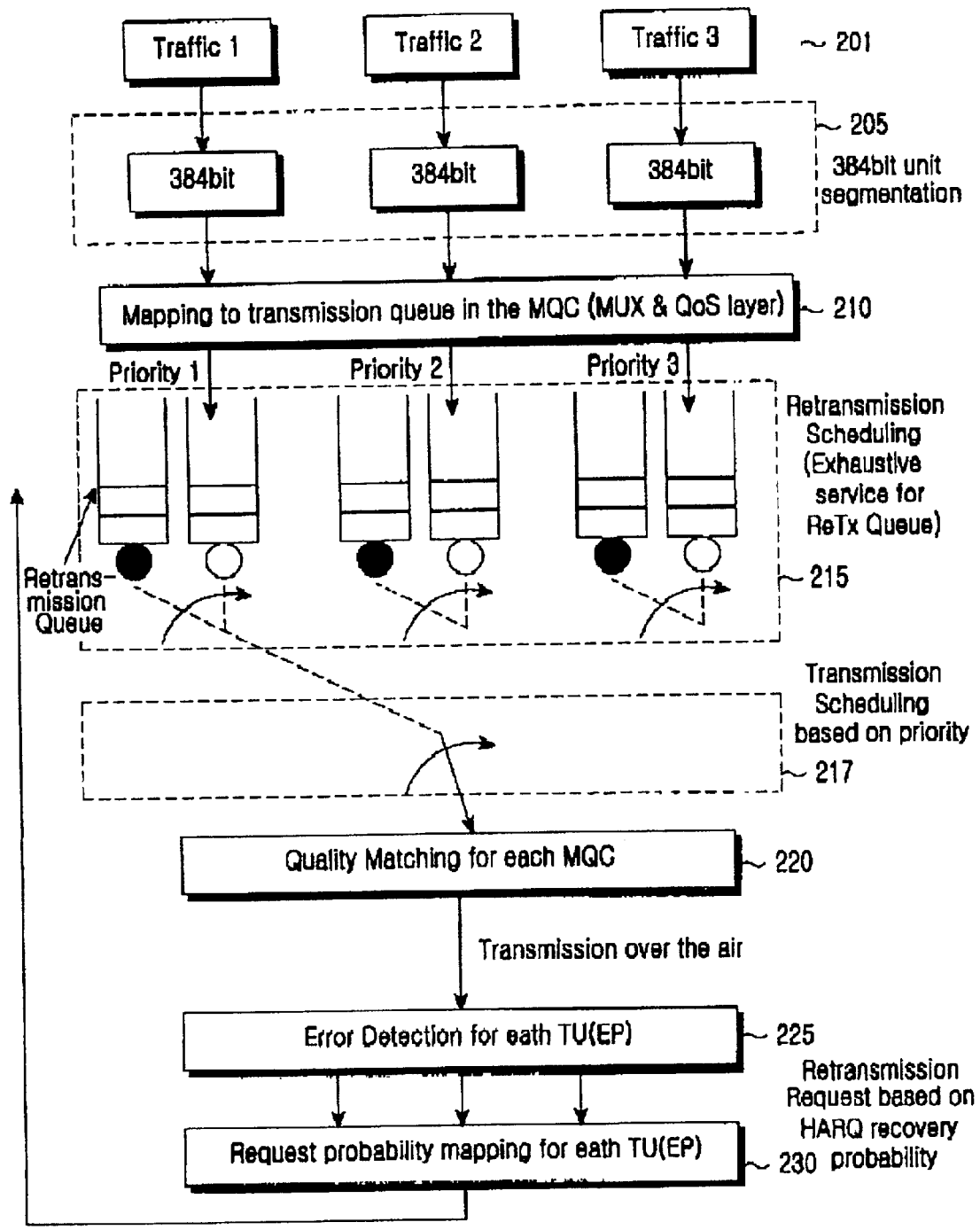
FIG. 2 illustrates main function blocks in the base station and an MS, for transmitting and receiving multiple TUs in a PLP (Physical Layer Packet) on multiple channels according to an embodiment of the present invention.

FIG. 2 illustrates transmission of TUs on multiple channels from the base station to a particular MS according to an embodiment of the present invention. Referring to FIG. 2, reference numeral 201 denotes arrival of three types of application service data in the base station. The application service data 201 are segmented into 384-bit TUs 205. The segmentation units may be set to a different length.

A multiplexer (MUX) & QoS layer 210 assigns the TUs to buffers according to the priority levels of the TUs. Three buffers 215 are assigned to store the application service data because three types of application service data are provided to the MS. In addition to the three initial transmission buffers, three more retransmission buffers are assigned to the MS in order to retransmit to the MS TUs in which errors were detected. Retransmission data has priority over initial transmission data during transmission until the retransmission buffers are empty. A number of retransmission buffers equal to the number of initial transmission buffers are assigned to each MS. For example, if a TU exists in one of the retransmission buffers for MS 1, the base station does not switch a server 27 to one of buffers for MS 2 until it transmits the retransmission TU to MS 1.

Though not shown in FIG. 2, the base station subjects the transmission data to channel coding to minimize errors. The channel coding can be convolutional coding or turbo coding. While it is assumed that the application service data are stored in the buffers in 384-bit TUs for clarity of description, since the TUs are payloads that are to be added with CRC bits and tail bits in real implementation, they have a length of (384 bits−CRC bits−tail bits). If a 3072-bit data block is transmittable at 307.2 Kbps, its payload, including CRC bits and tail bits, is 3072 bits. In other words, a transmission TU is formed by adding CRC bits and tail bits to the payload. The TU is channel-encoded prior to transmission to an MS. Let the three buffers be an H-priority buffer (or H-priority buffer), an M-priority buffer (or M-priority buffer), and an L-priority buffer (or L-priority buffer) according to the priority levels (i.e. high, medium, and low) of the application service data stored in the buffers, and a TU/TUs from the three buffers be TU0, TU1, and TU2, respectively. Then, if a 3072-bit encoder packet (EP) includes TU 0 (1536 bits), TU 1 (768 bits) and TU 2 (768 bits) in combination, the real payload data is 1536+768+768−(CRC+tail)×3. CRC bits are added to each TU before QM. The TUs are encoded and then quality-matched according to its QoS. Here, one thing to be noted in the description of the present invention is that a TU unit or TU units from each H-priority priority buffer is collectively called a TU in a singular form, unless otherwise specifically denoted. For example, if a PLP includes TUs from the H-priority buffer and TUs from the M-priority buffer, they can be called a TU from the H-priority buffer and a TU from the M-priority buffer, or TU0 and TU1, or an H-priority TU and an M-priority TU, respectively. In other words, a TU to be transmitted may include one TU unit or a plurality of TU units.

Then, the server 217 selects an MS and then selects one of the H, M, and L-priority buffers assigned to the MS according to a given data rate and the priority levels of the TUs stored in the buffers.

Reference numeral 220 denotes quality matching for each TU. After a QM value is assigned to each TU, the TU is transmitted to the MS over the air.

An error detector 225 in the MS detects errors in a received PLP. In the case of an initially transmitted PLP, the error detector 225 checks the CRC of the TUs in the PLP. In the case of a retransmission PLP, the error detector 225 checks the CRCs of the TUs of the retransmission PLP after combining the retransmission PLP with a previously received initial transmission PLP by HARQ supported in the physical layer. The combining operation by HARQ is beyond the scope of the present invention and thus its description is avoided here.

A feedback frame transmitter 230 transmits ACK/NACK signals on a TU basis for initial transmission TUs, and retransmission TUs after combining. Therefore, a feedback frame has ACK signals and NACK signals of which the sum is equal to the number of TUs in the PLP. An ACK signal indicates that reception of a corresponding TU failed and a NACK signal indicates that a corresponding TU is successively received.

FIG. 3 illustrates examples of TU combinations that can be produced from the buffers in the case of data transmission on three channels in a multi-channel structure according to the present invention.

Table 1 below lists transmittable total TU sizes and the numbers of available slots according to data rates in connection with FIG. 3.

TABLE 1

| Data rate [Kbps] | Total TU size (=3072 bits) Number of slots per PLP | Total TU size (=1536 bits) Number of slots per PLP | Total TU size (=768 bits) Number of slots per PLP | Total TU size (=384 bits) Number of slots per PLP |
| --- | --- | --- | --- | --- |
| 38.4 | ADR | ADR | ADR | 8 |
| 76.8 | ADR | ADR | 8 | 4 |
| 153.6 | ADR | 8 | 4 | 2 |
| 307.2 | 8 | 4 | 2 | 1 |
| 614.4 | 4 | 2 | 1 | DRD |
| 1228.8 | 2 | 1 | DRD | DRD |
| 2457.6 | 1 | DRD | DRD | DRD |

* ADR represents aggressive data rate and DRD represents data rate down.

As seen from Table 1, forward available data rates range from 38.4 Kbps to 2457.6 Kbps and the number of slots per PLP is mapped to each data rate according to an available total TU size (EP size). If the base station has 384 bits in a buffer and an available data rate is 38.4 kbps, the base station transmits the 384-bit data in eight slots to the MS. Total TU size in Table 1 indicates the sum of 384-bit TU units. If the total TU size is 3072 bits, it means that eight TU units are transmitted.

If the base station has a 3072-bit EP and an available data rate is given as 38.4 Kbps according to the carrier-to-interference ratio (C/I) of a received signal, two ways can be considered to transmit the EP. First, a 384-bit PLP can be formed and transmitted in eight slots at 38.4 Kbps, eight times. Alternatively, a 3072-bit PLP can be formed and transmitted in eight slots at 307.2 Kbps. The transmission at a higher data rate than the available data rate is called ADR. ADR does not take place at initial transmission, and at retransmission ADR takes place by the Round-Robin scheduling in which the data rate used in initial transmission is kept for retransmission. However, if a different scheduling method is adopted, ARD can take place at retransmission.

In the scheduling method according to the present invention, when there are at least two TUs to be retransmitted but the at least two TUs cannot be retransmitted in combination at the current data rate, a higher priority TU is retransmitted first at the current scheduling, while the lower priority TU is delayed to the next scheduling. Yet, if a full ADR is adopted, the TUs are transmitted in combination at an increased data rate regardless of their priority levels. On the other hand, if the priority levels are considered in scheduling, ARD is partially applied. This is called semi-ADR.

Concerning DRD operation, available total TU sizes for 307.2 Kbps are 3072 bits (8 slots), 1536 bits (4 slots), 768 bits (2 slots), and 384 bits (1 slot), for example. The total TU size is determined according to the number of 384-bit TU units stored in the buffers. If the available data rate is 1228.8 Kbps and one, two or three TU units are stored in the buffers, the data rate is changed according to the total TU sizes. (1) One unit TU (384 bits): 307.2 Kbps/1 slot (DRD);(2) Two unit TUs (768 bits): 614.4 Kbps/1 slot (DRD); and (3) Three unit TUs (1152 bits): 614.4 Kbps/1 slot (DRD). In this case, two unit TUs are transmitted at the current scheduling and the other unit TU is buffered for transmission at the next scheduling.

Now, TU combination and transmission in the multi-channel structure according to the present invention will be described with reference to Table 1 and FIGS. 3A to 3D. While the following description is made in the context of three application service data for an MS, it is a mere exemplary application. The transmission apparatus and method are applicable irrespective of the number of application services provided to the MS.

Initial Transmission

An MQC operation refers to concurrent transmission of traffic data from two or more traffic sources in a single PLP. Turbo-encoded TUs from different traffic sources are quality-matched prior to transmission. If three MQC channels exist, TUs from the buffers can be combined to an appropriate size according to a given data rate as illustrated in FIGS. 3A to 3D. In FIGS. 3A to 3D, TU 0, TU 1, and TU 2 are generated from H, M and L traffic sources, respectively, as stated before. If the size of TUs to be transmitted is not available at a given data rate, the TUs are transmitted at a data rate changed by DRD, ADR, or semi-ADR.

Referring to FIG. 3A, only 384 bits of one TU can be transmitted at 38.4 Kbps in Case I. Since it is impossible to transmit two TUs at the same time, they are transmitted one by one according to their priority levels.

Referring to FIG. 3B, 384 or 768 bits of one TU can be transmitted, and when the total TU size is 768 bits, two TUs can be transmitted in a combination type of (384+384) in Case II. Thus, the TU combination type of Case I is available and up to two TUs in combination can be transmitted in a PLP in Case II.

Referring to FIG. 3C, 384, 768, or 1536 bits of one TU can be transmitted at 153.6 Kbps in Case III. When the total TU size is 768 or 1536 bits, two TUs can be transmitted in the combination type of (384+384) or (768+768). Only if the total TU size is 1536 bits can three TUs can be transmitted in a combination type of (384+384+768 irrespective of order). Thus, the TU combination types of Case I and Case II are available in Case III.

Referring to FIG. 3D, Case IV is Divided into Four Sub-Cases.

Case IV-1 (307.2 Kbps): 384, 768, 1536, or 3072 bits of one TU can be transmitted. When the total TU size is 768, 1536, or 3072 bits, two TUs can be transmitted in the combination type of (384+384), (768+768), or (1536+1536).

If the total TU size is 1536 or 3072 bits, three TUs can be transmitted in a combination type of (384+384+768 irrespective of order) or (768+768+1536 irrespective of order). That is, the TU combination types of Case I, Case II, and Case III are available in Case IV-I.

Case IV-2 (614.4 Kbps): 384, 768, 1536, or 3072 bits of one TU can be transmitted. When the total TU size is 768, 1536, or 3072 bits, two TUs can be transmitted in the combination type of (384+384), (768+768), or (1536+1536). If the total TU size is 1536 or 3072 bits, three TUs can be transmitted in a combination type of (384+384+768 irrespective of order) or (768+768+1536 irrespective of order). That is, the TU combination types of Case I, Case II, and Case III are available in Case IV-I.

Case IV-3 (1228.8 Kbps): 1536 or 3072 bits of one TU can be transmitted. When the total TU size is 1536, or 3072 bits, two TUs can be transmitted in the combination type of (768+768) or (1536+1536). Under the total TU size of 1536 or 3072 bits, three TUs can also be transmitted in a combination type of (384+384+768 irrespective of order) or (768+768+1536 irrespective of order).

Case IV-4 (2457.6.8 Kbps): 3072 bits is the only available total TU size. Therefore, 3072 bits of one TU can be transmitted without being combined with another TU, two TUs can be transmitted in the combination type of (1536+1536), and three TUs can be transmitted in the combination type of (768+768+1536 irrespective of order).

In the MQC operation, once a data rate is determined, a maximum available total TU size is determined. TUs are read out from the three buffers to the maximum total TU size by scheduling described in the following.

Supposition 1: if the H-priority buffer has 384-bit TU units of which the size is greater than or equal to a maximum total TU size available at a determined data rate, H-priority TU units of the maximum total TU size are mapped to the data rate and the number of slots for transmitting the unit TUs is determined referring to Table 1. In this case, only one type of traffic source data stored in the H-priority buffer is transmitted in a PLP.

Supposition 2: if 384-bit TU units in the H-priority buffer is less than the maximum total TU size, the H-priority unit TUs are mapped to the data rate and TUs from the M-priority buffer and the L-priority buffer are sequentially mapped in a TU combination available at the data rate as illustrated in FIG. 3. The TU filling from the M-priority and L-priority buffers is performed in the same manner as the TU filling from the H-priority buffer. If the sum of the TUs from the three buffers is less than the maximum total TU size, read-out is carried out again to meet a second maximum available total TU size at the same data rate.

For example, the maximum total TU size allowed at 307.2 Kbps is 3072 bits in Table 1. If the sum of TUs read out from the three buffers is less than 3072 bits, the read-out is performed again from the three buffers, combining readout TUs as illustrated in FIG. 3, to meet the second to maximum total TU size, i.e., 1536 bits. Under the total TU size of 1536 bits, two or more TUs in combination can be transmitted in one PLP. To combine at least two TUs, a maximum available total TU size at each data rate should be 768, 1536 or 3072 bits. The TUs are combined according to the maximum available TU size as illustrated in FIGS. 3B, 3C and 3D.

Supposition 3: If the H-priority buffer is empty, TU units are read out from the M-priority buffer according to the data rate in a similar manner to Supposition 1. If the M-priority buffer is also empty, TU units are read out from the L-priority buffer.

Supposition 4: if all the three buffers are empty, no scheduling is performed.

Figure 4:
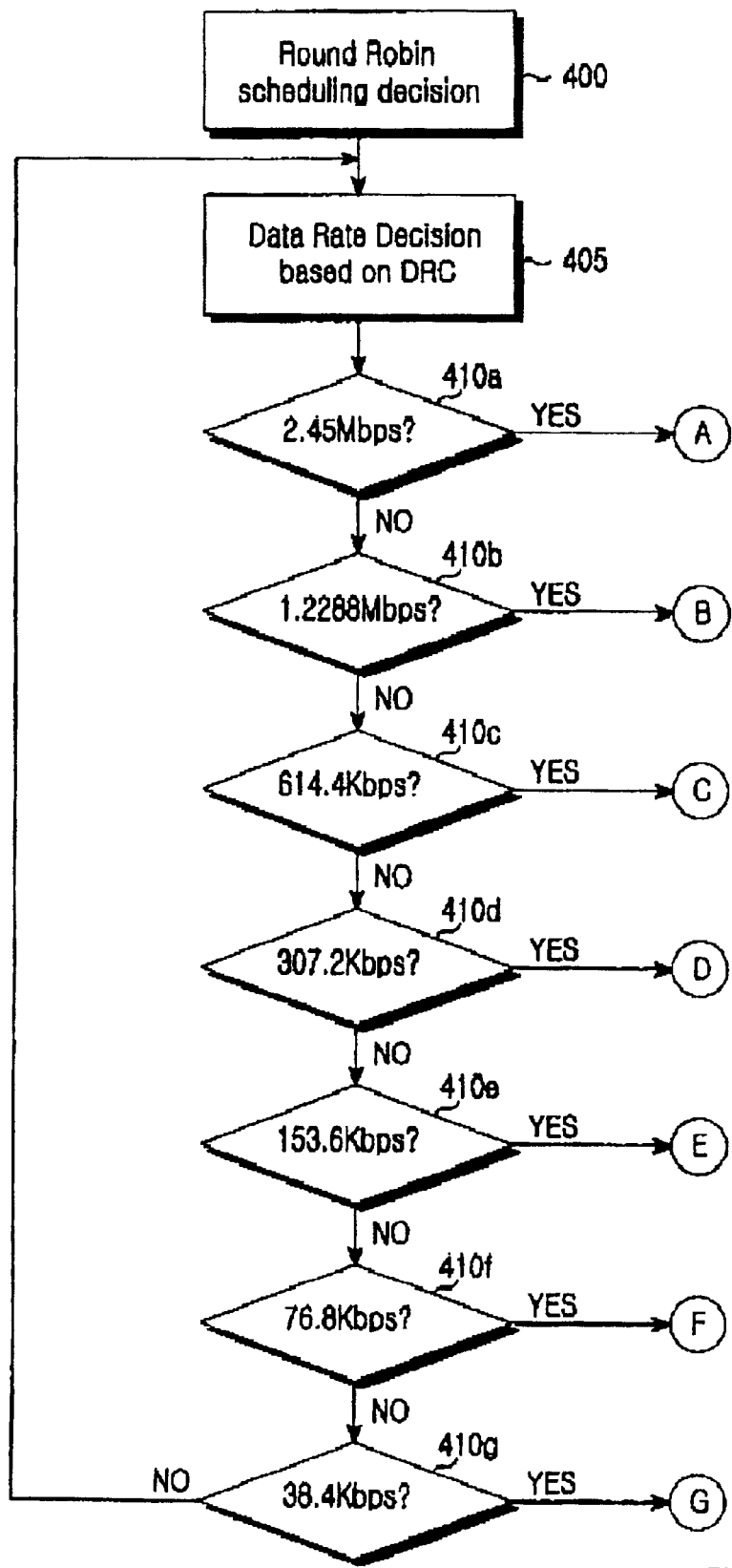
FIG. 4 is a flowchart illustrating a data rate determining operation in the base station to determine a data rate by which TUs are combined to construct a PLP according to an embodiment of the present invention.

FIG. 4 is a flowchart illustrating a control operation for determining a data rate in the base station according to the present invention.

Referring to FIG. 4, the base station determines a scheduling algorithm to be used in step 400. The scheduling algorithm can be a Round-Robin one, a maximum C/I one, or both in combination, i.e., a hybrid scheduling using weighting values. In the embodiment of the present invention, the Round-Robin scheduling is adopted by way of example.

The base station determines a data rate based on information received from an MS, such as DRC (Data Rate Control) information in step 405. In the embodiment of the present invention, available forward data rates are 2.4576 Mbps, 1.2288 Mbps, 614.4 Kbps, 307.2 Kbps, 153.6 Kbps, 76.8 Kbps, and 38.4 Kbps. Payload length and the number of slots to be transmitted vary according to data rates, as stated before.

One of the data rates provided in a system according to the present invention is chosen in steps 410a to 410g. If the data rate cannot be determined based on the reverse information, scheduling is performed to reset the data rate. Data is transmitted at the data rate determined in steps 410a to 410g.

FIGS. 5A to 5D are flowcharts illustrating a control operation for initial data transmission at 2.4576 Mbps according to the present invention.

Figure 5A:
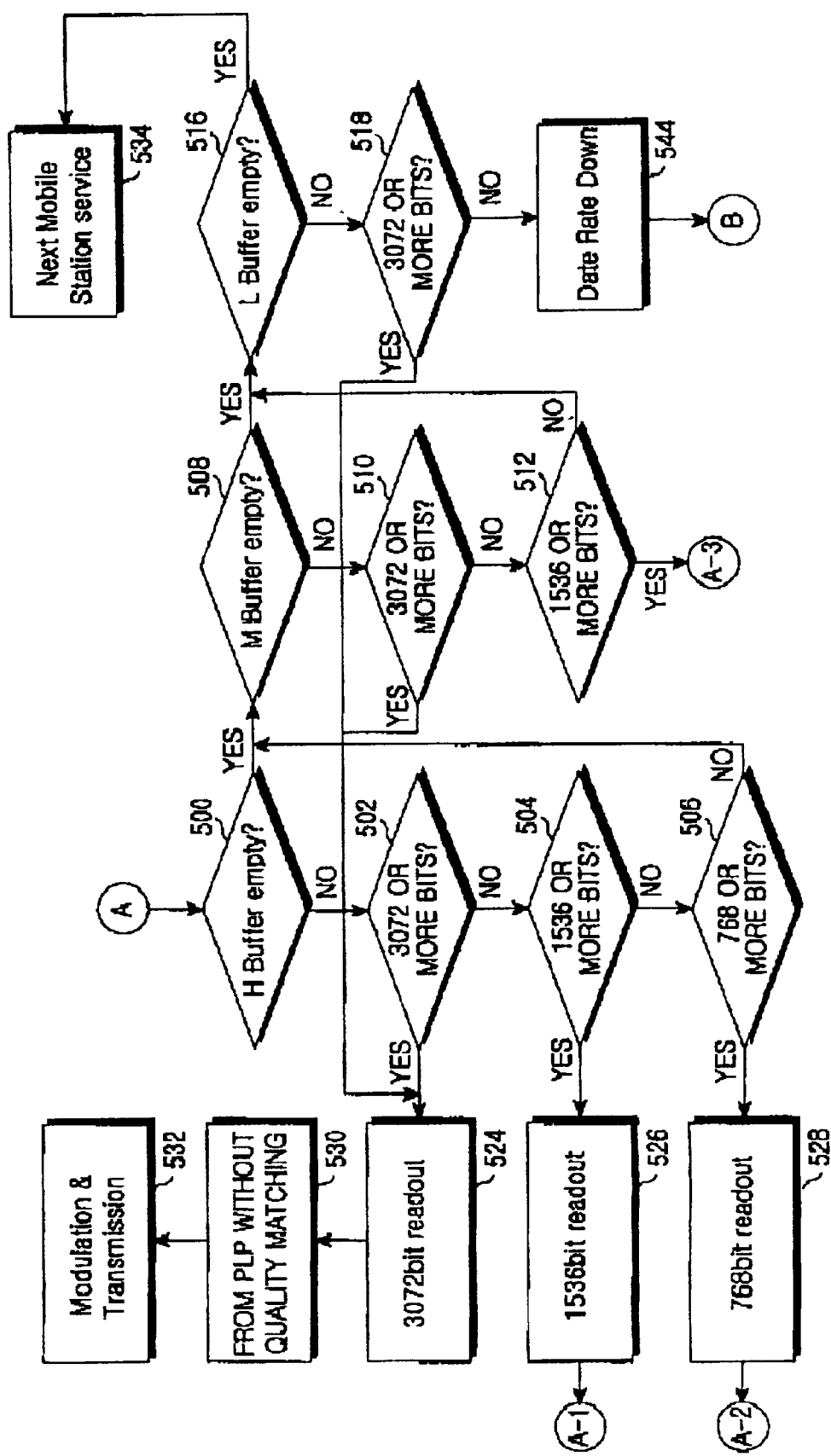
FIGS. 5A to 5G are flowcharts illustrating initial data transmission at 2.4576 Mbps according to an embodiment of the present invention.

Referring to FIG. 5A, step 500 is the first step in a routine A branched from step 410a. Data are read out from the buffers sequentially according to the priority levels of the buffers in step 500, 508 or 516. The priority levels of the buffers are determined according to the characteristics of application services and reception sequence. Traffic data with a high priority level are stored in the H-priority buffer in a reception time order, traffic data with a middle priority level are stored in the M-priority buffer in the reception time order, and traffic data with a low priority level are stored in the L-priority buffer in the reception time order. If two application services are provided to the MS, data transmission is carried out using two buffers and two channels.

If the H-priority buffer is empty in step 500, the base station determines whether the M-priority buffer is empty in step 508. If the M-priority buffer is also empty, the base station checks the L-priority buffer in step 516. If even the L-priority buffer is also empty, the base station goes to step 534 to service the next MS.

On the other hand, if the H-priority buffer is not empty in step 500, the base station determines whether the H-priority buffer has data of 3072 or more bits in step 502. If 3072 or more bits exist in the H-priority buffer, the base station reads out 3072 bits in step 524 and forms a PLP with the 3072-bit data without quality matching in step 530. In step 532, the base station modulates the PLP and transmits it on a physical channel to the MS. Meanwhile, if the H-priority buffer has data less than 3072 bits in step 502, the base station determines whether the H-priority buffer has data of 1536 or more bits in step 504. If the H-priority buffer has 1536 or more bits, the base station reads out 1536 bits from the H-priority buffer in step 526 and performs a routine A-1. If the H-priority buffer has data less than 1536 bits in step 504, the base station determines whether the H-priority buffer has 768 or more bits in step 506. If the data of the H-priority buffer is 768 or more bits, the base station reads out 768 bits from the H-priority buffer in step 528 and performs a routine A-2.

On the other hand, if the H-priority buffer has data less than 768 bits in step 506, steps 508 to 524 are performed. A read-out operation in steps 508 to 524 is performed in the same manner as read-out from the H-priority buffer to combine TUs according to the data rate and the priority levels of the TUs. A predetermined amount of data is read out from the M-priority buffer in step 508 to 524. Similarly, if the M-priority buffer has data less than 1536 bits, data is read out from the L-priority buffer in steps 516 to 524 in the same manner.

However, if at least one of the three buffers is not empty but the data stored in the buffer does not satisfy the available total TU size, i.e., 3072 bits at 2457.6 Mbps, the base station performs DRD in step 544. That is, the data rate 2.4567 Mbps is decreased to 1.2288 Mbps and a PLP is formed with data stored in the buffer at 1.2288 Mbps. After the DRD operation, a routine B is performed.

Figure 5B:
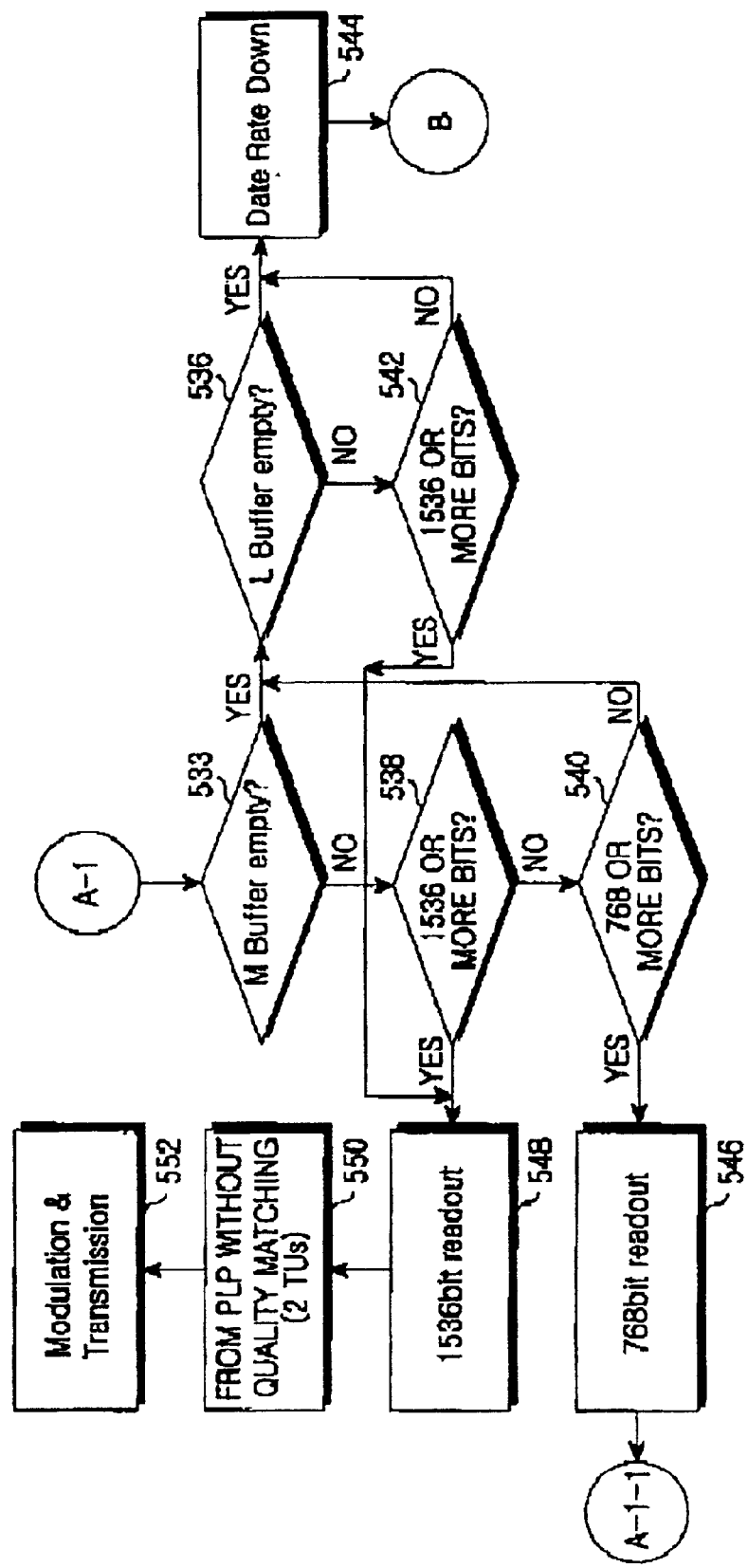

Referring to FIG. 5B, the routine A-1 is carried out after the 1536 bits are read out from the H-priority buffer. To transmit 3072 bits at 2.4576 Mbps, the other required bits must be filled in a PLP from the M-priority buffer or the L-priority buffer or both. In step 533, the base station determines whether the M-priority buffer is empty. If the M-priority buffer is empty, the base station determines whether the L-priority buffer is also empty in step 536. If both the M-priority buffer and the L-priority buffer are empty, the base station performs a DRD operation in step 544 and proceeds to routine B.

If the M-priority buffer is not empty in step 533, the base station determines whether the M-priority buffer has data of 1536 or more bits in step 538. If the M-priority buffer has 1536 or more bits, the base station reads out 1536 bits from the M-priority buffer in step 548 and forms a PLP with the 3072 bits read out from the H and M-priority buffers in step 550. The base station modulates the PLP and transmits it on the physical channel to the MS in step 552. In this case, the PLP includes TUs from the H-priority buffer and the M-priority buffer. On the other hand, if the M-priority buffer has data less than 1536 bits in step 538, the base station determines whether the M-priority buffer has data of 768 or more bits in step 540. If 768 or more bits exist in the M-priority buffer, the base station reads output 768 bits from the M-priority buffer in step 546 and takes a routine A-1-1. If the M-priority buffer is empty in step 533, the base station determines whether the L-priority buffer is also empty in step 536. If the L-priority buffer is not empty, the base station determines whether the L-priority buffer has data of 1536 or more bits in step 542. If 1536 or more bits are in the L-priority buffer, the base station performs steps 548 to 552. If the L-priority buffer has data less than 1536 bits in step 542, the base station goes to step 544. Since the total TU size must be 3072 bits at 2.4576 Mbps, 1536 bits were read out from the H-priority buffer, and the M-priority TU is not available, the base station determines whether the L-priority buffer has data less than 1536 bits to transmit two TUs from the H and L-priority buffers in a PLP at 2.4576 Mbps. If the L-priority buffer has data less than 1536 bits in step 542, the base station goes to step 544 without determining whether the data of the L-priority buffer is at least 768 bits.

Figure 5C:
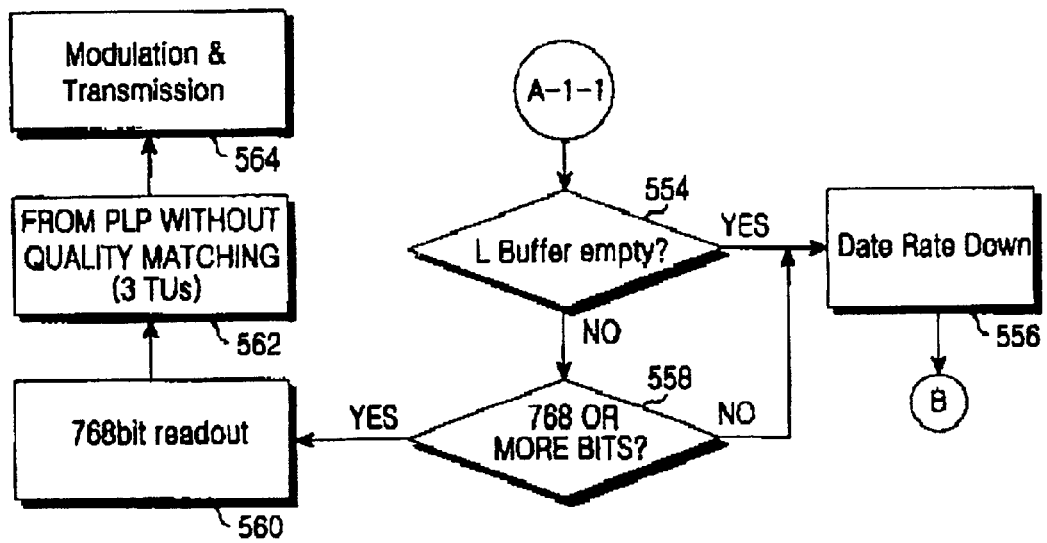

Referring to FIG. 5C, the routine A-1-1 is performed. The base station determines whether the L-priority buffer is empty in step 554. If the L-priority buffer is empty, the base station performs a DRD operation in step 556. If the L-priority buffer is not empty, the base station determines whether the L-priority buffer has data of 768 or more bits in step 558. If the L-priority buffer has 768 or more bits, the base station goes to step 560 and otherwise, it performs the DRD operation in step 556. The reason for checking whether the L-priority buffer has 768 or more bits is that the base station has already read out 1536 bits from the H-priority buffer and 768 bits from the M-priority buffer. To generate 3972 bits at 2.4576 Mbps, 768 more bits should be read from the L-priority buffer. The base station reads out 768 bits from the L-priority buffer in step 560 and forms a PLP with the TUs read out from the three buffers in step 562. No quality matching is performed on the TUs, here. In step 564, the base station modulates the PLP and transmits it on the physical channel to the MS.

Figure 5D:
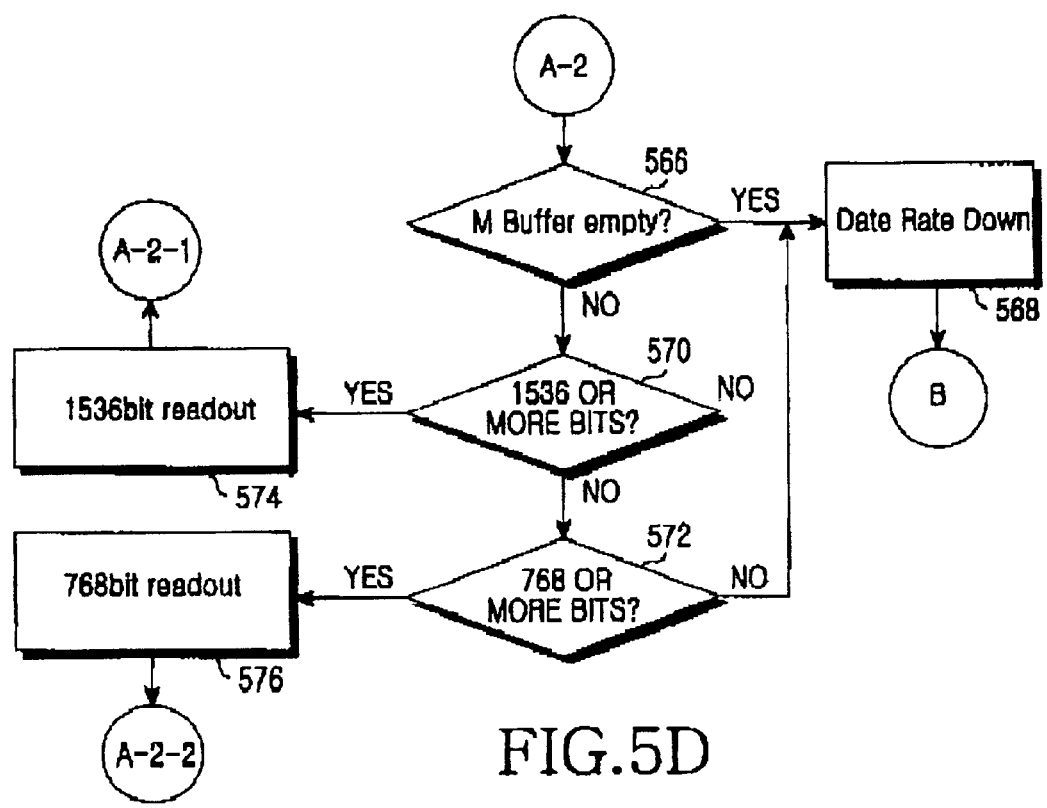

Now, the routine A-2 will be described. Referring to FIG. 5D, since 768 bits were read out from the H-priority buffer, TUs must be read out from the other two buffers to form a PLP. In step 566, the base station determines whether the M-priority buffer is empty. If the M-priority buffer is empty, the base station performs a DRD operation in step 568. If the M-priority buffer is not empty, the base station determines whether the M-priority buffer has data of 1536 or more bits in step 570. Since 768 bits have already been read out from the H-priority buffer, 1536 bits must be read out from either the M-priority buffer or the L-priority buffer to form a 3072-bit PLP with three TUs. If the M-priority buffer has 1536 or more bits in step 570, the base station reads out 1536 bits from the M-priority buffer in step 574 and then takes a routine A-2-1. On the other hand, if the M-priority buffer has data less than 1536 bits in step 570, the base station determines whether the M-priority buffer has at least 768 bits in step 572. If the M-priority buffer has at least 768 bits, the base station reads 768 bits from the M-priority buffer in step 576 and then takes a routine A-2-2. Meanwhile, if the M-priority buffer has data less than 768 bits in step 572, the base station performs the DRD operation in step 568 and performs the routine B.

Figure 5E:
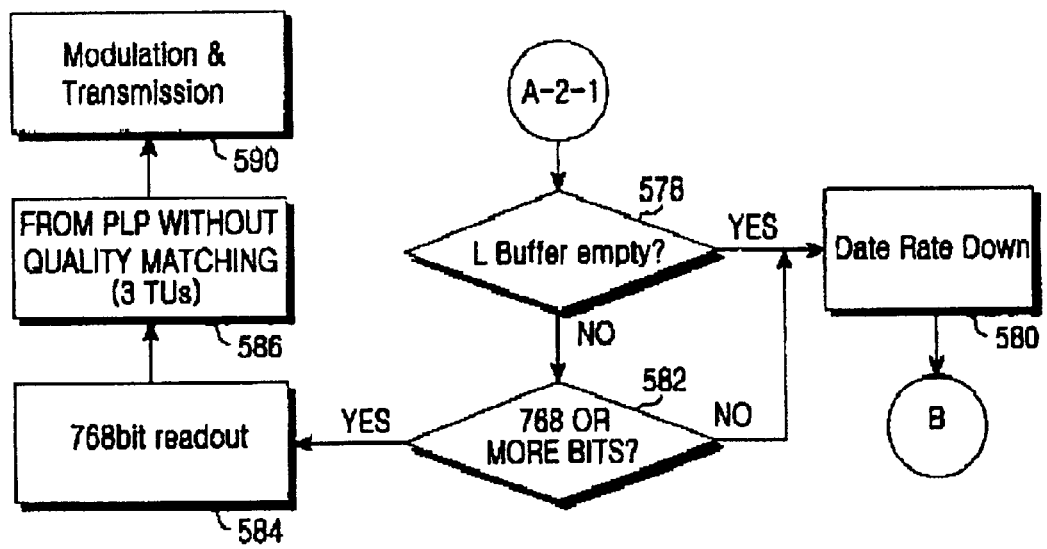

Referring to FIG. 5E, because 768 bits were read out from the H-priority buffer and 1536 bits from the M-priority buffer, 768 bits must be read out from the L-priority buffer in the routine A-2-1 to form the 3072-bit PLP. The base station determines whether the L-priority buffer is empty in step 578. If the L-priority buffer is empty, the base station performs a DRD operation in step 580 and performs the routine B. On the other hand, if the L-priority buffer is not empty in step 578, the base station determines whether the L-priority buffer has data of 768 or more bits in step 582. If the L-priority buffer has 768 or more bits, the base station reads out 768 bits from the L-priority buffer in step 584 and forms a PLP with three TUs read out from the H, M and L-priority buffers in step 586. The base station modulates the PLP and transmits it on the physical channel to the MS in step 590.

Figure 5F:
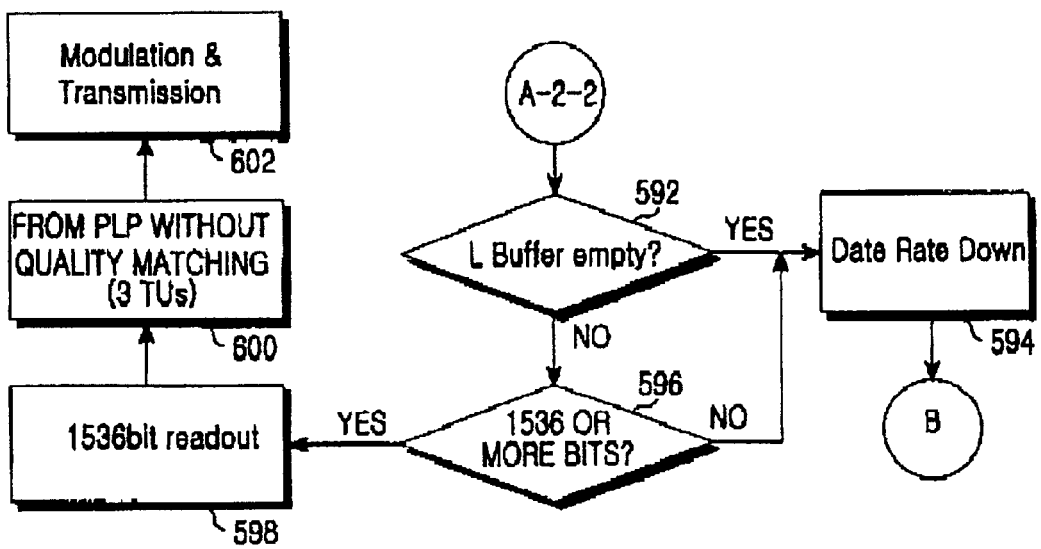

In the case where 768 bits are read out from each of the H-priority buffer and the M-priority buffer, the routine A-2-2 is performed. To transmit the 3072-bit PLP at 2.4576 Mbps, at least 1536 bits should exist in the L-priority buffer. Referring to FIG. 5F, the base station determines whether the L-priority buffer is empty in step 592. If the L-priority buffer is empty, the base station performs a DRD operation in step 594 and enters the routine B. On the other hand, if the L-priority buffer is not empty, the base station determines whether the L-priority buffer has 1536 or more bits in step 596. If 1536 or more bits are present in the L-priority buffer, the base station reads out 1536 bits from the L-priority buffer in step 598 and forms a PLP with the TUs read out from the three buffers in step 600. In step 602, the base station modulates the PLP and transmits it on the physical channel to the MS.

Figure 5G:
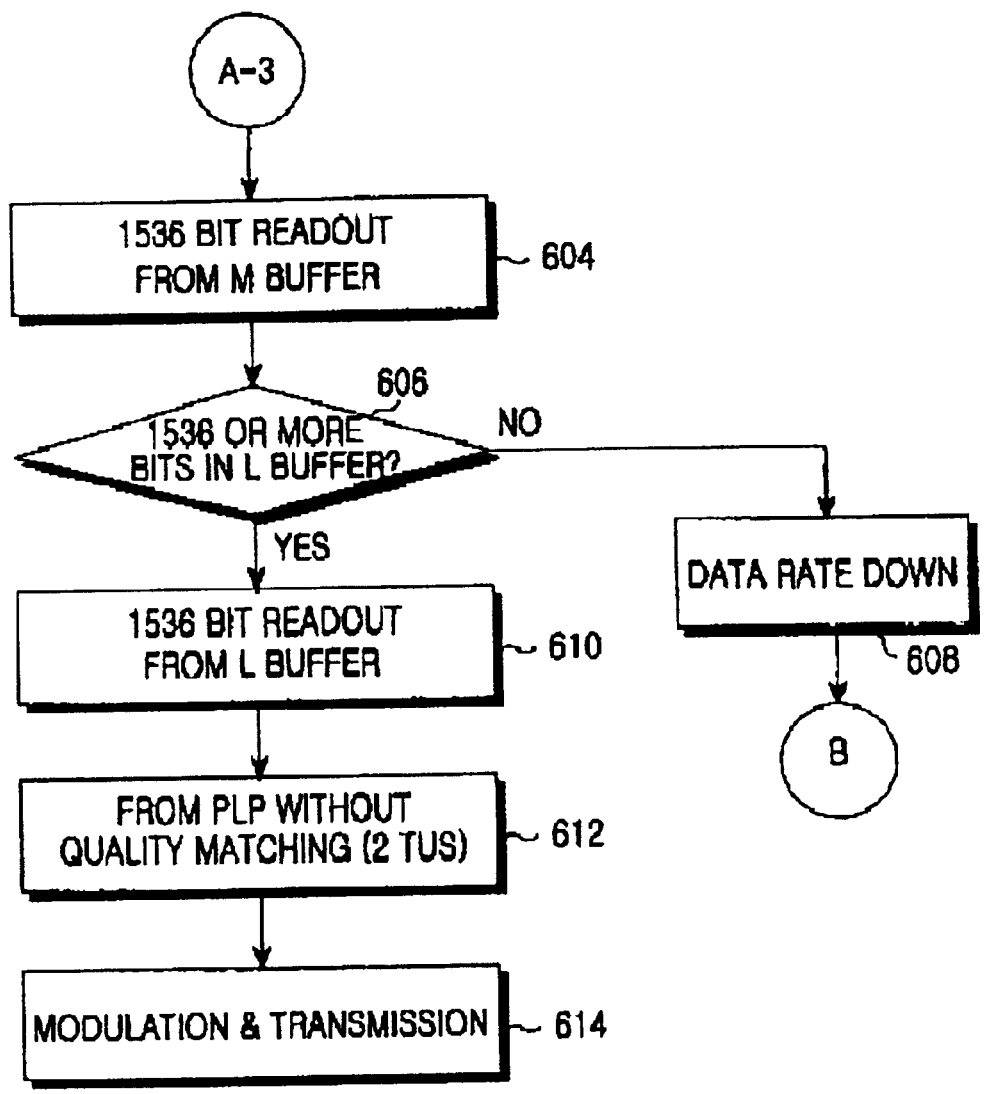

The routine A-3 is taken when no data are read out from the H-priority buffer and the M-priority buffer has at least 1536 bits. Only if the L-priority buffer has at least 1536 bits can the 3072-bit PLP be formed out of TUs read out from the M and L-priority buffers at 2.4576 Mbps. Referring to FIG. 5G, the base station reads out 1536 bits from the M-priority buffer and determines whether the L-priority buffer has at least 1536 bits in step 606. If the L-priority buffer has at least 1536 bits, the base station goes to step 610 and otherwise, it performs a DRD operation in step 608 and then takes the routine B. In step 610, the base station reads out 1536 bits from the L-priority buffer. Then, the base station forms a PLP out of the TUs read from the M and L-priority buffers without quality matching in step 612. In step 614, the base station modulates the PLP and transmits it to the MS in step 614. In accordance with the embodiment of the present invention, if the data stored in the H-priority buffer is not enough to satisfy the data rate, data is read out from the M and L-priority buffers according to the data rate. On the other hand, if the algorithm is performed in such a manner that data in the H-priority buffer is transmitted regardless of the amount of the data, the routine A-3 is not needed. In this case, the DRD operation is directly carried out.

FIGS. 6A to 6K are flowcharts illustrating a control operation for initial data transmission at 1.2288 Mbps according to the present invention.

Figure 6A:
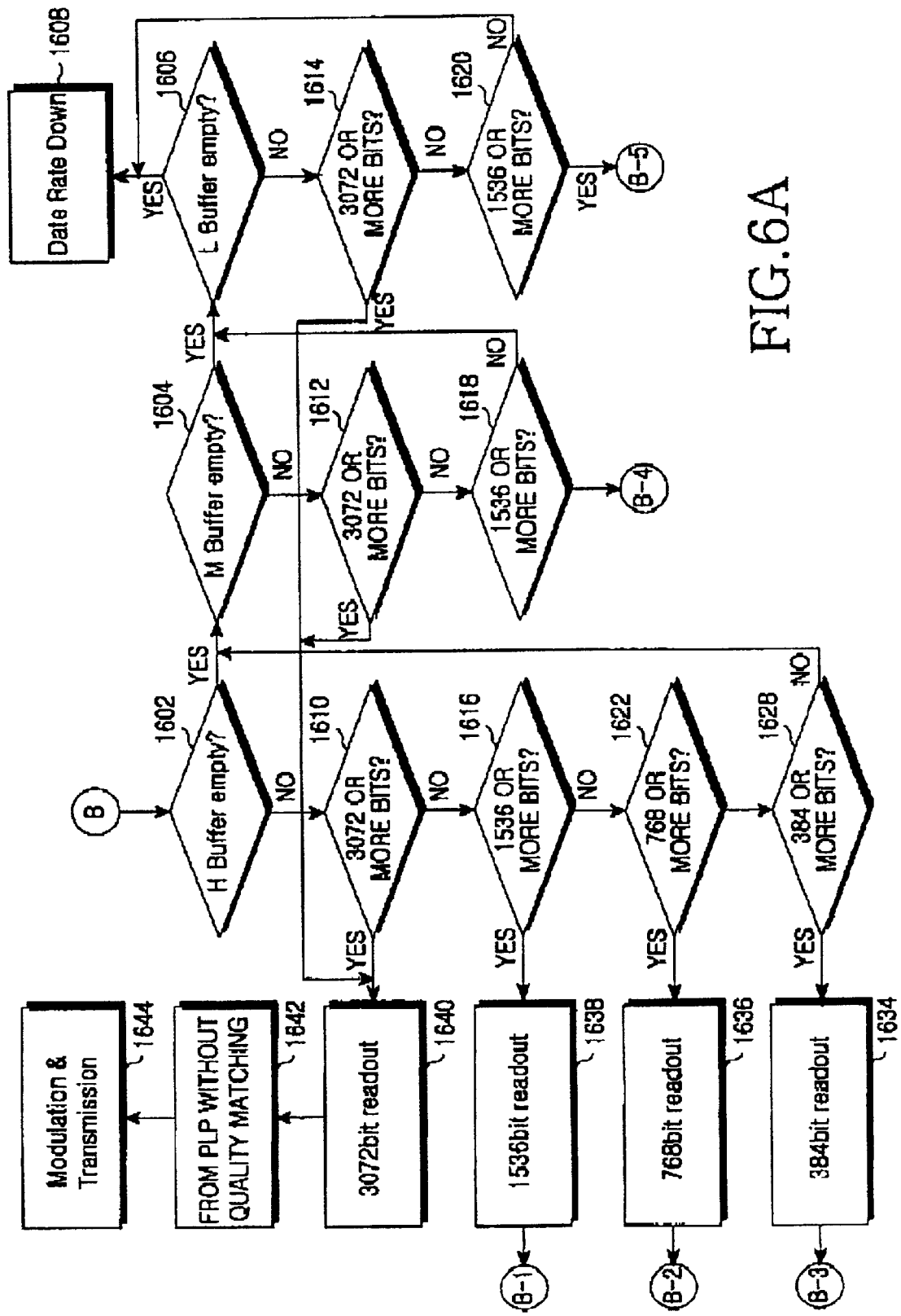
FIGS. 6A to 6K are flowcharts illustrating initial data transmission at 1.2288 Mbps according to an embodiment of the present invention.

Referring to FIG. 6A, the routine B is branched from the flowchart illustrated in FIG. 4. The base station determines whether the H-priority buffer is empty in step 1602. If the H-priority buffer is empty, the base station goes to step 1604. If the H-priority buffer is not empty, the base station determines whether the H-priority buffer has 3072 or more bits in step 1610. The reason for performing step 1610 is that one TU can be transmitted in a PLP at 1.2288 Mbps when the total TU size is 1536 or 3072 bits and it is preferable to form the PLP with the maximum available total TU size, i.e., 3072 bits. If 3072 or more bits exist in the H-priority buffer, the base station reads out 3072 bits in step 1640 and forms a PLP with the TU units read out from the H-priority buffer in step 1642. In step 1644, the base station modulates the PLP and transmits it on the physical channel to the MS.

Meanwhile, if the H-priority buffer has data less than 3072 bits in step 1610, the base station determines whether the H-priority buffer has at least 1536 bits in step 1616. If the H-priority buffer has at least 1536 bits, the base station goes to step 1638 and otherwise, it goes to step 1622. The base station reads out 1536 bits from the H-priority buffer in step 1638 and performs a routine B-1. In step 1622, the base station determines whether the H-priority buffer has at least 768 bits. If the data of the H-priority buffer is 768 or more bits, the base station goes to step 1636 and otherwise, it goes to step 1628. The base station reads out 768 bits from the H-priority buffer in step 1636 and performs a routine B-2.

On the other hand, the base station determines whether the H-priority buffer has 384 or more bits in step 1628. If there are at least 384 bits in the H-priority buffer, the base station reads out 384 bits from the H-priority buffer in step 1634 and takes a routine B-3. If the H-priority buffer has data less than 384 bits, the base station goes to step 1604.

In step 1604, the base station determines whether the M-priority buffer is empty. If the M-priority buffer is empty, the base station goes to step 1606 and otherwise, it goes to step 1612. Only when no data is read out from the H-priority buffer, the M-priority buffer is checked. Therefore, a PLP must be formed out of TUs from either the M or L-priority buffer, or both. The base station determines whether the M-priority buffer has data of 3072 or more bits in step 1612. If the M-priority buffer has at least 3072 bits, the base station performs steps 1640 to 1644 and otherwise, it goes to step 1618.

In step 1618, the base station determines whether the data stored in the M-priority buffer is 1536 or more bits. If the M-priority buffer has at least 1536 bits, the base station takes a routine B-4 and otherwise, it goes to step 1606.

When no data are read out from either the H-priority buffer or the M-priority buffer, data from the L-priority buffer must be transmitted at 1.2288 Mbps. Therefore, the base station determines whether the L-priority buffer is empty in step 1606. If the L-priority buffer is empty, the base station performs a DRD operation in step 1608 and otherwise, it goes to step 1614. In step 1614, the base station determines whether the L-priority buffer has data of 3072 or more bits to check whether a PLP can be formed with a L-priority TU in the maximum total TU size. If at least 3072 bits are in the L-priority buffer, the base station performs steps 1640 to 1644. If the L-priority buffer has data less than 3072 bits in the L-priority buffer, the base station determines whether the L-priority buffer has at least 1536 bits in step 1620. If there are at least 1536 bits in the L-priority buffer, the base station takes a routine B-5.

Figure 6B:
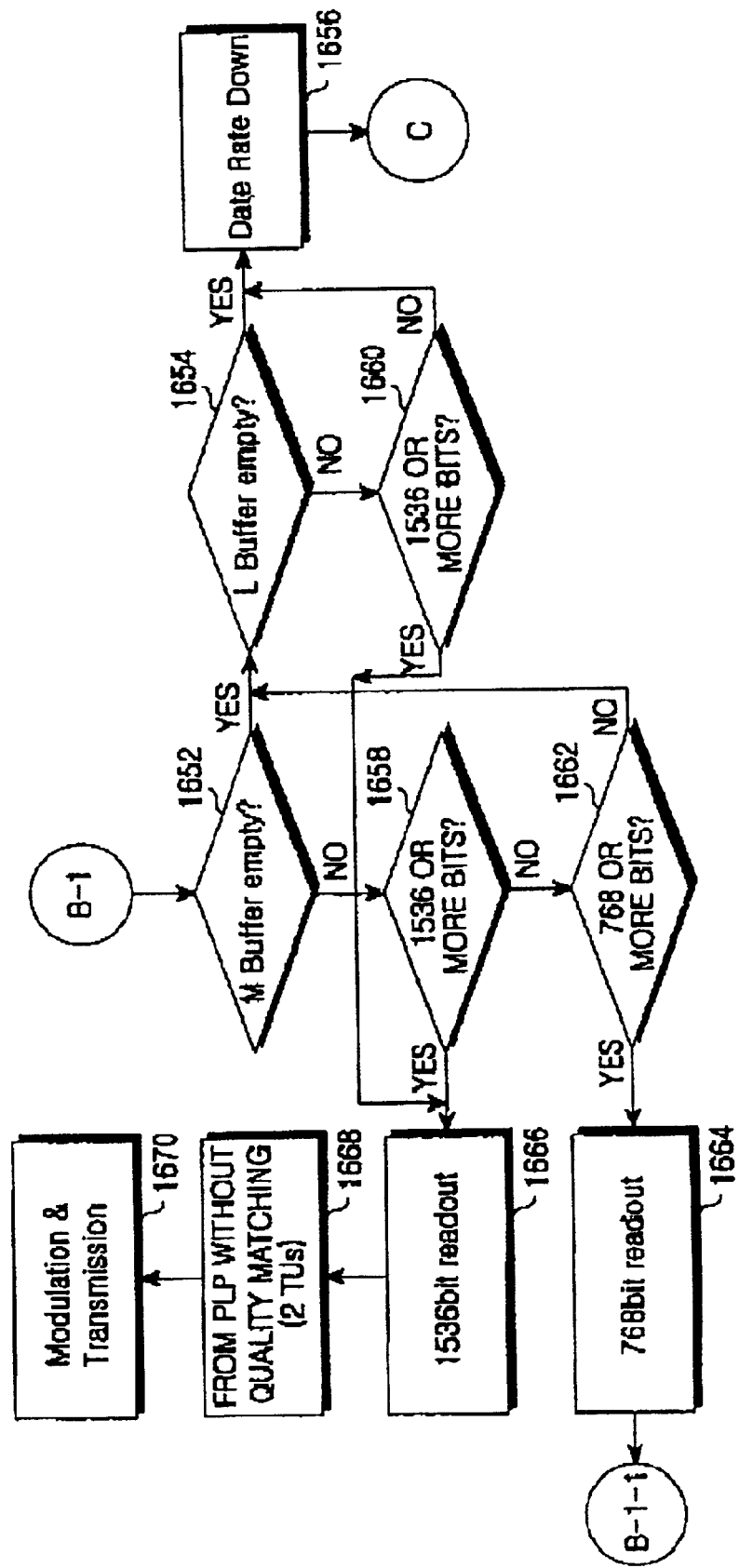

In the case where 1536 bits were read out from the H-priority buffer, the routine B-1 is performed. Referring to FIG. 6B, the base station determines whether the M-priority buffer is empty in step 1652. If the M-priority buffer is empty, the base station goes to step 1654 and otherwise, it goes to step 1658. Since 1536 bits were read out from the H-priority buffer, 1536 bits should be read out from either the M-priority buffer or the L-priority buffer, or 768 bits should be read out from each of the M and L-priority buffers in order to transmit a 3072-bit PLP at 1.2288 Mbps. Therefore, the base station determines whether the M-priority buffer has at least 1536 bits in step 1658. If there are at least 1536 bits in the M-priority buffer, the base station reads out 1536 bits from the M-priority buffer in step 1666 and forms a PLP with TUs read out from the H and M-priority buffers without quality matching in step 1668. In step 1670, the base station modulates the PLP and transmits it to the MS.

If the M-priority buffer has data less than 1536 bits in step 1658, the base station determines whether the data stored in the M-priority buffer is at least 768 bits in step 1662. If the M-priority buffer has at least 768 bits, the base station goes to step 1664 and otherwise, it goes to step 1654. In step 1664, the base station reads out 768 bits from the M-priority buffer and then takes a routine B-1-1. On the other hand, if less than 768 bits are stored in the M-priority buffer, the base station determines whether the L-priority buffer is empty in step 1654. If the L-priority buffer is empty, the base station performs a DRD operation in step 1656. If the L-priority buffer is not empty, the base station determines whether the L-priority buffer has data of 1536 or more bits in step 1660, in order to form a 3072-bit PLP with TUs from the H and L-priority buffers in a combination type of (1536+1536) because no data is read out from the M-priority buffer. If the L-priority buffer has 1536 or more bits, the base station performs steps 1666 to 1670. If the L-priority buffer has data less than 1536 bits, the base station performs the DRD operation in step 1656.

Figure 6C:
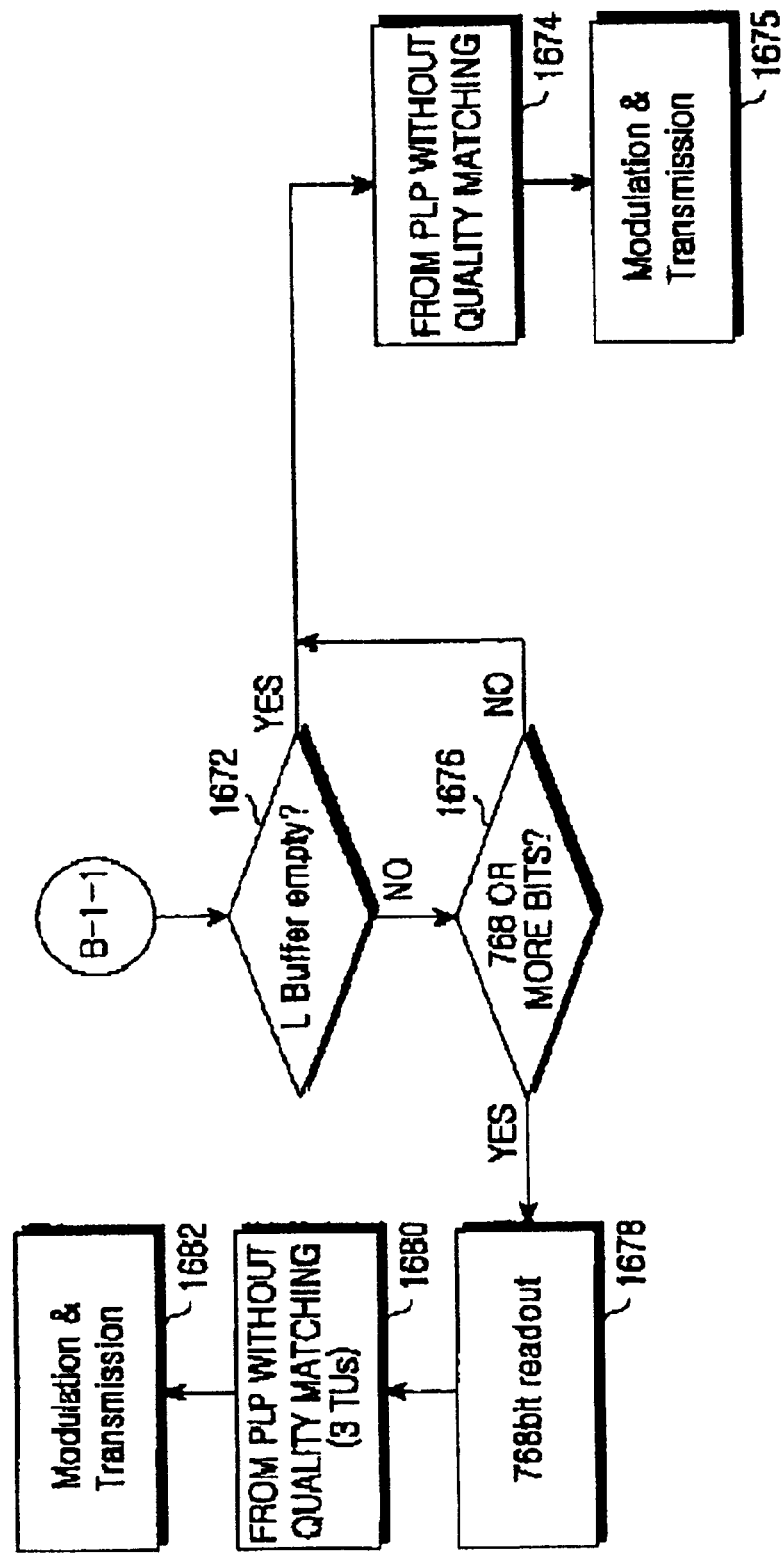

After 1536 bits and 768 bits are read out from the H-priority buffer and the M-priority buffer, respectively, 768 bits must be read out from the L-priority buffer in the routine B-1-1 in order to form a 3072-bit PLP with three TUs. Referring to FIG. 6C, the base station determines whether the L-priority buffer is empty in step 1672. If the L-priority buffer is empty, the base station goes to step 1674 and otherwise, it determines whether the L-priority buffer has 768 or more bits in step 1676. If 768 or more bits are in the L-priority buffer, the base station goes to step 1678 and otherwise, it goes to step 1674.

In step 1678, the base station reads out 768 bits from the L-priority buffer. The base station forms a PLP with the TUs from the H, M and L-priority buffers in a combination type of (1536+768+768) without quality matching in step 1680 and modulates and transmits it to the mobile station in step 1682.

Figure 6D:
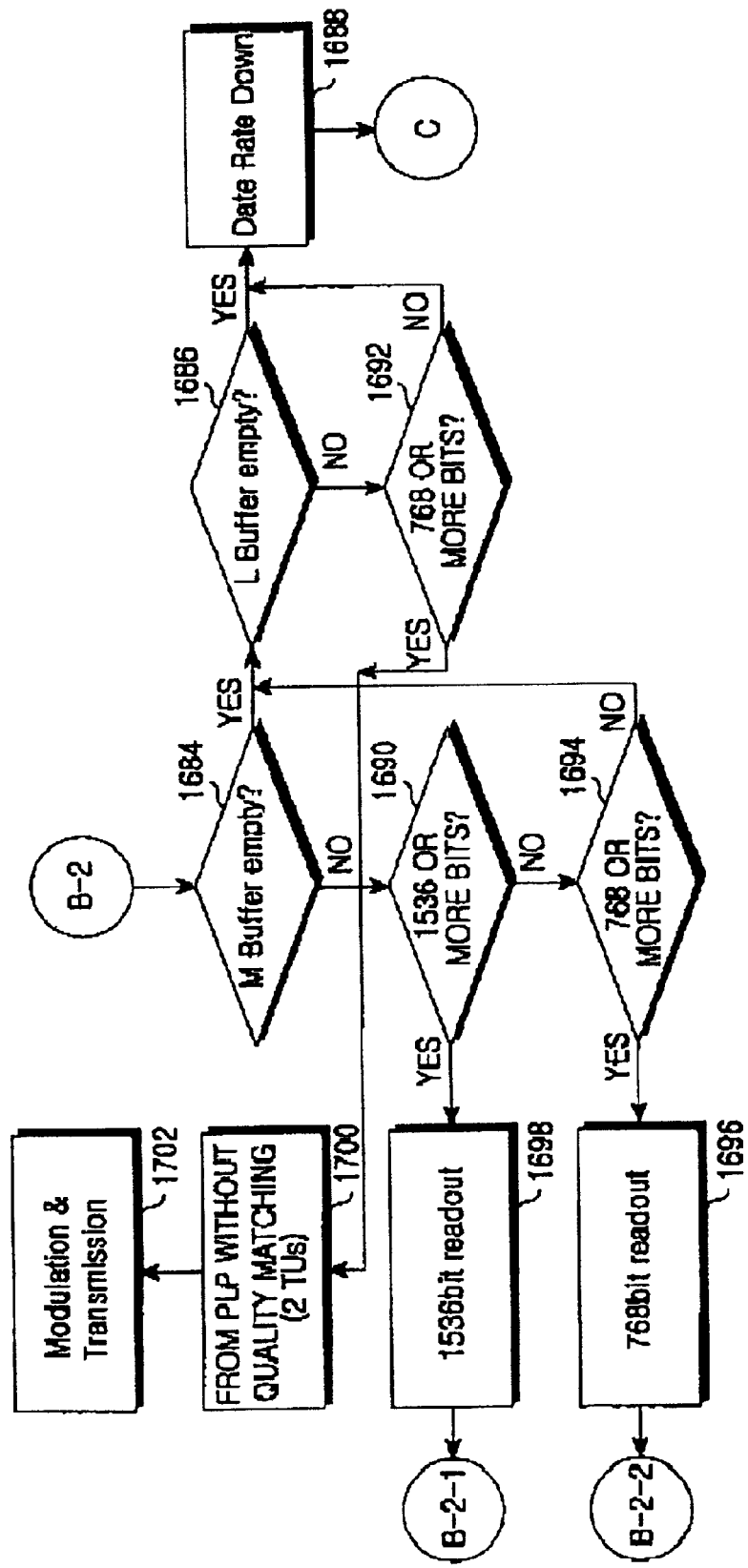

If 768 bits are read out from the H-priority buffer, a 1536-bit PLP or a 3072-bit PLP can be formed for 1.2288 Mbps. Referring to FIG. 6D, the base station determines whether the M-priority buffer is empty in step 1684. If the M-priority buffer is empty, the base station goes to step 1686 and otherwise, it goes to step 1690. In step 1690, the base station determines whether the M-priority buffer has 1536 or more bits. If the M-priority buffer has 1536 or more bits, the base station reads out 1536 bits from the M-priority buffer in step 1698 and then takes a routine B-2-1. If the M-priority buffer has data less than 1536 bits in step 1690, the base station goes to step 1694.

Figure 6E:
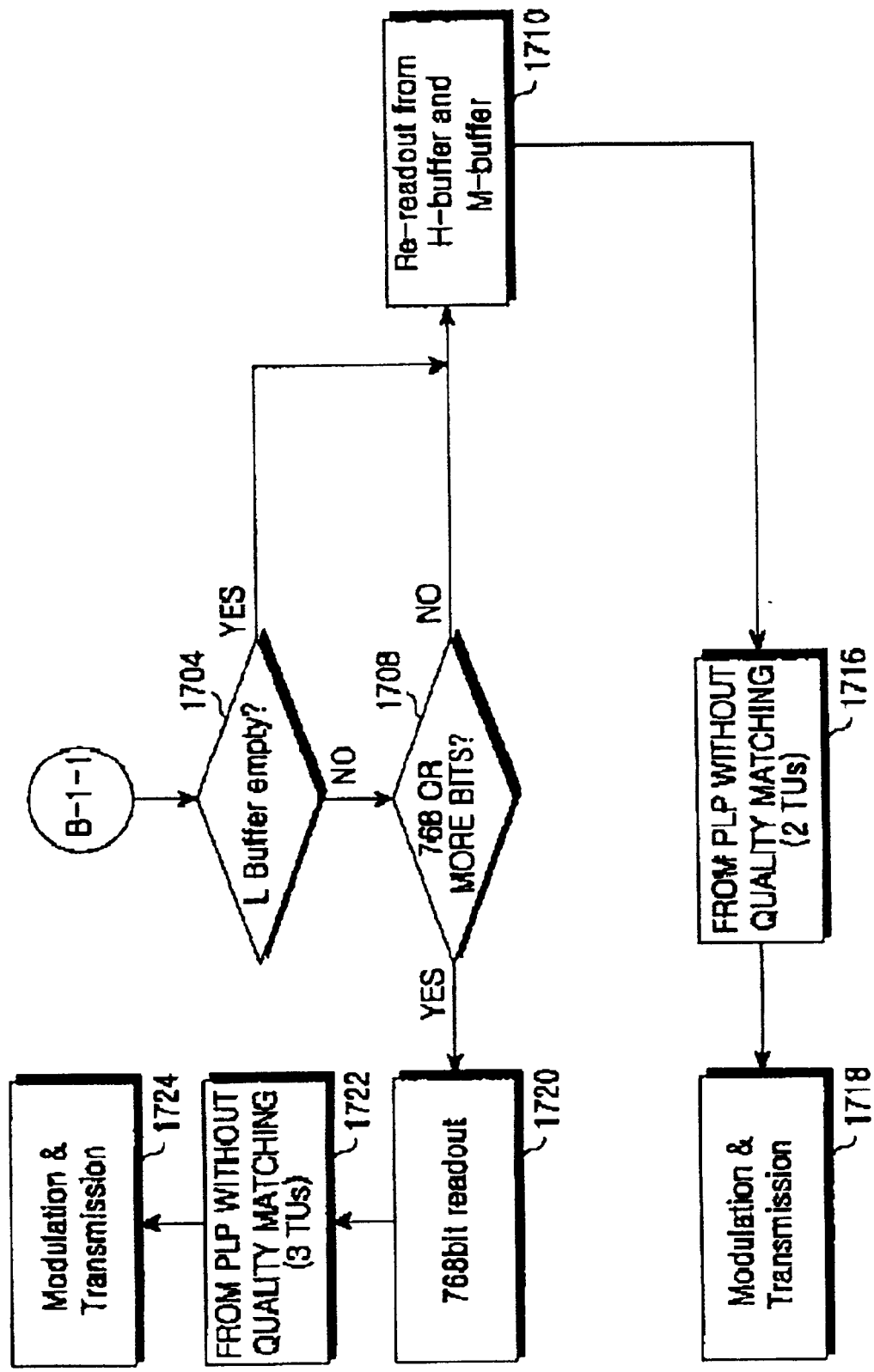

In the case where 768 bits and 1536 bits are read out from the H-priority buffer and the M-priority buffer, respectively, the routine B-2-1 is performed. Referring to FIG. 6E, the base station determines whether the L-priority buffer is empty in step 1704. If the L-priority buffer is empty, the base station goes to step 1710 and otherwise, it goes to step 1708. In step 1708, the base station determines whether the L-priority buffer has data of 768 or more bits. If the L-priority buffer has 768 or more bits, the base station reads out 768 bits from the L-priority buffer in step 1720 and forms a 3072-bit PLP with three TUs read out from the buffers without quality matching in step 1722. The base station modulates the PLP and transmits it on the physical channel to the MS in step 1724.

On the other hand, if the L-priority buffer is empty or the L-priority buffer has data less than 768 bits, the base station re-reads out 768 bits from each of the H-priority buffer and the M-priority buffer in step 1710 and forms a PLP with two TUs each having 768 bits without quality matching in step 1716. The base station modulates the PLP and transmits it to the base station in step 1718.

Returning to FIG. 6D, if the M-priority buffer has data less than 1536 bits in step 1690, the base station determines whether the M-priority buffer has data of 768 or more bits in step 1694. If the M-priority buffer has 768 or more bits, the base station reads out 768 bits from the M-priority buffer in step 1696 and takes a routine B-2-2. On the other hand, if the M-priority buffer has less than 768 bits, the base station goes to step 1686.

Figure 6F:
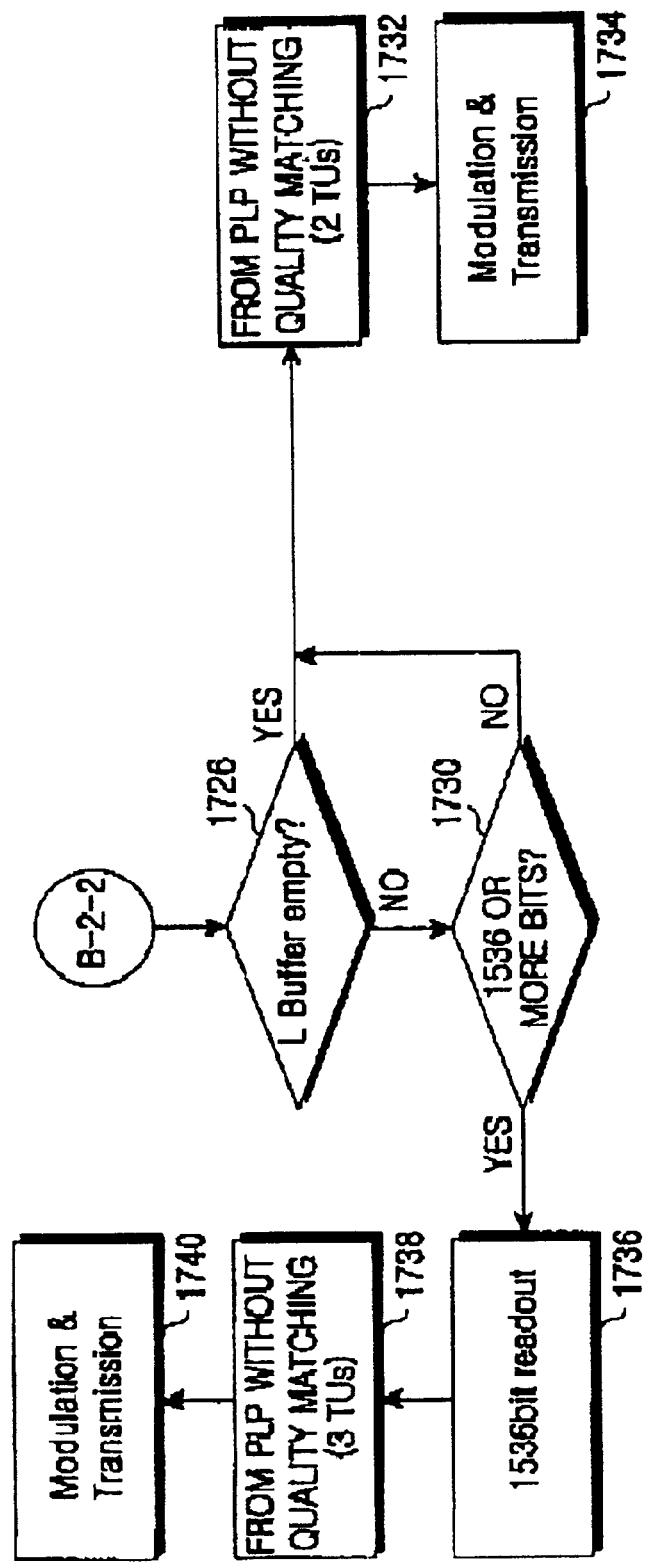

Now, the routine B-2-2 in the case where 768 bits area read out from each of the H and M-priority buffers will be described referring to FIG. 6F. In step 1726, the base station determines whether the L-priority buffer is empty. If the L-priority buffer is empty, the base station goes to step 1732 and otherwise, it goes to step 1730. In step 1730, the base station determines whether the L-priority buffer has 1536 or more bits. The reason for performing step 1730 is that a PLP can be formed from three TUs by reading out 384 bits from each of two buffers and 768 bits from the other buffer, or reading out 768 bits from each of two buffers and 1536 bits from the other buffer. Here, since 768 bits have been read out from each of the H and M-priority buffers, a 3072-bit PLP can be formed with three TUs if the L-priority buffer has at least 1536 bits. Therefore, if the L-priority buffer has at least 1536 bits in step 1730, the base station goes to step 1736 and otherwise, it goes to step 1732.

The base station reads out 1536 bits from the L-priority buffer in step 1736 and forms a PLP with the TUs read out from the three buffers without quality matching in step 1738. In step 1740, the base station modulates the PLP and transmits it on the physical channel to the MS.

If the base station moves from step 1726 or 1730 to step 1732, this implies that a 3072-bit PLP cannot be formed with three TUs. Therefore, the base station reads 1536 bits in total from the three buffers and transmits them, or reads out 3072 bits in total from two buffers and transmits them. In the embodiment of the present invention, transmission of a 3072-bit PLP is preferable in data transmission efficiency, which will be described. Since earlier readout TUs have a higher priority, TU transmission according to the present invention can be said to be a priority-based TU transmission scheme.

Therefore, the base station forms a PLP with the TUs read out from the H and M-priority buffers without quality matching in step 1732. In step 1734, the base station modulates the PLP and transmits it on the physical channel to the MS.

In the case where 768 bits are read from the H-priority buffer and no data are read from the M-priority buffer, there is no choice but to form a PLP out of TUs having 1536 bits in total by further reading out 768 bits from the L-priority buffer in order to transmit data at 1.2288 Mbps. Returning to FIG. 6D, the base station determines whether the L-priority buffer is empty in step 1686. If the L-priority buffer is empty, the base station performs a DRD operation in step 1688. If the L-priority buffer is not empty, the base station determines whether the L-priority buffer has at least 768 bits in step 1692. If the L-priority buffer has at least 768 bits, the base station reads out 768 bits from the L-priority buffer and forms a PLP with the TUs read out from the H and L-priority buffers without quality matching in step 1700. In step 1702, the base station modulates the PLP and transmits it to the MS.

In the case where the base station reads out 384 bits from the H-priority buffer, it performs the routine B-3. In order to transmit a PLP with three TUs at 1.2288 Mbps, the PLP is formed to have 1536 bits, i.e., 384 bits from each of two buffers and 768 bits from the other buffer.

Figure 6G:
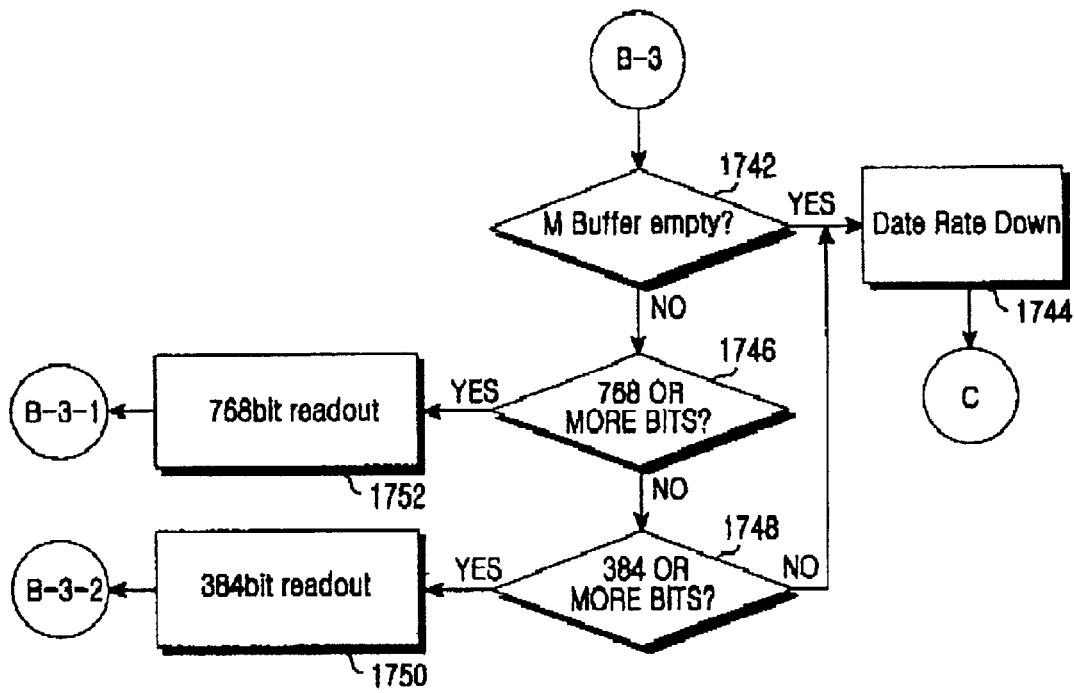

Referring to FIG. 6G, the base station determines whether the M-priority buffer is empty in step 1742. If the M-priority buffer is empty, the base station performs a DRD operation in step 1744. If the M-priority buffer is not empty, the base station determines whether the M-priority buffer has data of 768 or more bits in step 1746. If the M-priority buffer has 768 or more bits, the base station reads out 768 bits from the M-priority buffer in step 1752 and then performs a routine B-3-1 to read out 384 bits from the L-priority buffer.

Figure 6H:
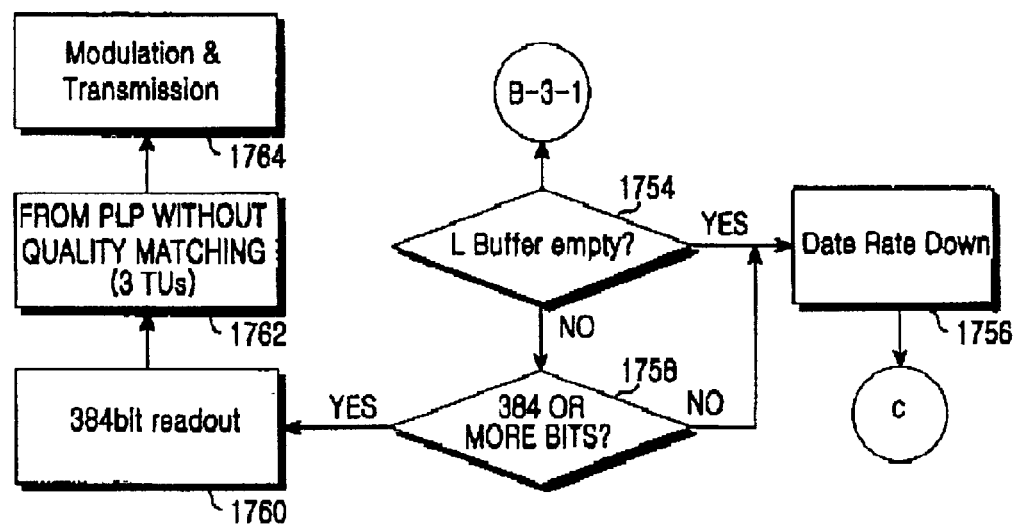

The routine B-3-1 will be described referring to FIG. 6H. In FIG. 6H, the base station determines whether the L-priority buffer is empty in step 1754. If the L-priority buffer is empty, the base station performs a DRD operation in step 1756. If the L-priority buffer is not empty, the base station determines whether the L-priority buffer has data of 384 or more bits in step 1758. If the L-priority buffer has 384 or more bits, the base station reads out 384 bits from the L-priority buffer in step 1760 and forms a PLP with three TUs in step 1762. The base station modulates the PLP and transmits it on the physical channel to the MS in step 1764.

Returning to FIG. 6G, when the M-priority buffer has data less than 768 bits in step 1746, the base station determines whether the M-priority buffer has 384 or more bits in step 1748. If 384 or more bits are present in the M-priority buffer, the base station goes to step 1750 and otherwise, it performs the DRD operation in step 1744. The base station reads out 384 bits from the M-priority buffer in step 1750 and then performs a routine B-3-2 to read 768 bits from the L-priority buffer.

Figure 6I:
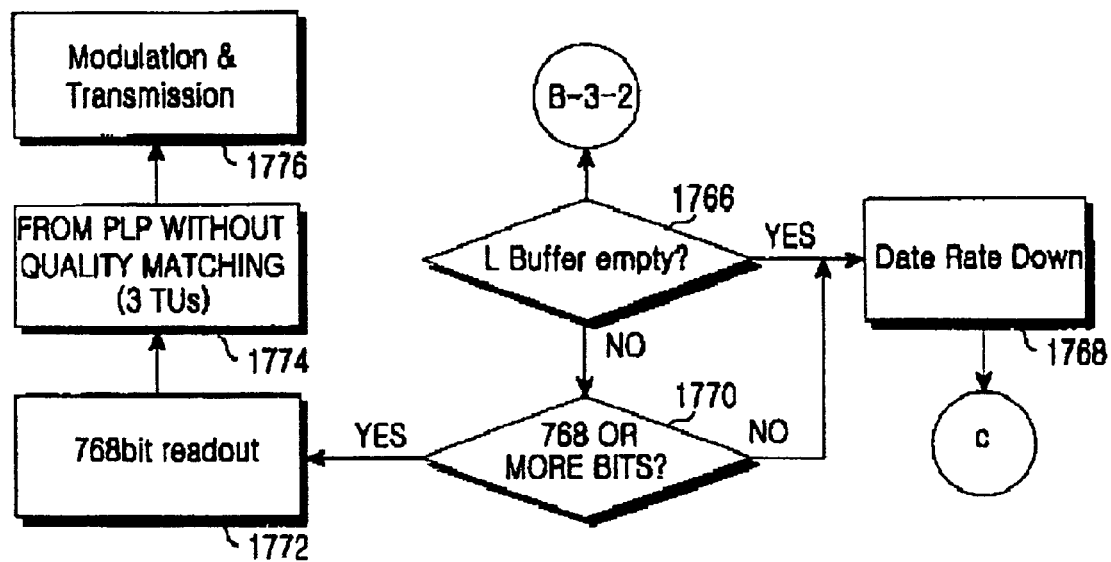

Referring to FIG. 6I, the base station determines whether the L-priority buffer is empty in step 1766 of the routine B-3-2. If the L-priority buffer is empty, the base station performs a DRD operation in step 1768. If the L-priority buffer is not empty, the base station determines whether the L-priority buffer has data of 768 or more bits in step 1770. If the L-priority buffer has less than 768 bits, the base station performs the DRD operation in step 1768. On the other hand, if the L-priority buffer has 768 or more bits, the base station reads out 768 bits from the L-priority buffer in step 1772 and forms a PLP with three TUs in step 1774. The base station modulates the PLP and transmits it on the physical channel to the MS in step 1776.

Figure 6J:
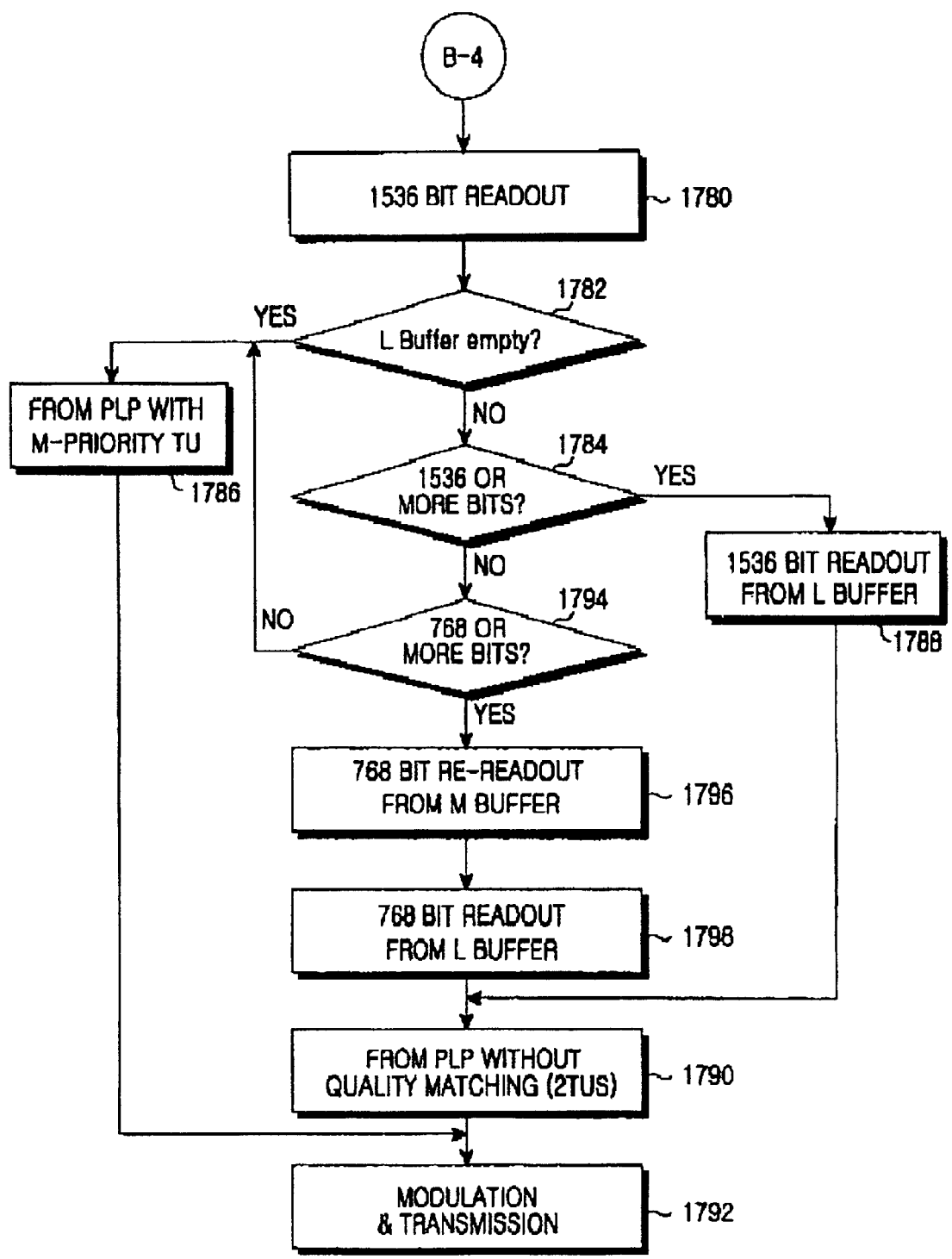

In the case where no data are read out from the H-priority buffer and the M-priority buffer has data having at least 1536 bits and less than 3072 bits, a routine B-4 is performed. Referring to FIG. 6J, the base station reads out 1536 bits from the M-priority buffer in step 1780. The base station determines whether the L-priority buffer is empty in step 1782. If the L-priority buffer is empty, the base station forms a PLP with only the M-priority TU in step 1786 and goes to step 1792.

On the other hand, if the L-priority buffer is not empty, the base station determines whether the L-priority buffer has data having 1536 or more bits in step 1784. If the L-priority buffer has at least 1536 bits, the base station reads out 1536 bits from the M-priority buffer in step 1794 because no data are read out from the H-priority buffer and 1536 bits are read out from the M-priority buffer. A PLP can be formed with TUs from the M and L-priority buffers at 1.2288 Mbps in two ways: one is to read out 1536 bits from each of two buffers and the other is to read out 768 bits from each of two buffers. That is why it is determined whether the L-priority buffer has at least 1536 bits. If the L-priority buffer has at least 1536 bits, the base station goes to step 1788 and otherwise, it goes to step 1794.

If the L-priority buffer has data having less than 1536 bits, the base station determines whether the L-priority buffer has 768 or more bits in step 1794. Since no data are read out from the H-priority buffer, it is determined whether a 1536-bit PLP can be formed with TUs from the M and L-priority buffers. If the L-priority buffer has 768 or more bits, the base station reads 768 bits from the M-priority buffer in step 1796 and then reads 768 bits from the L-priority buffer in step 1798. Thus, the 1536-bit PLP is formed using data from the M and L-priority buffers only.

In the case where no data can be read out from either the H-priority buffer or the M-priority buffer, that is, in the case where neither the H-priority buffer nor the M-priority buffer has data or they do not have enough data to be transmitted at 1.2288 Mbps, a routine B-5 is performed. In this case, at least 1536 bits are in the L-priority buffer.

Figure 6K:
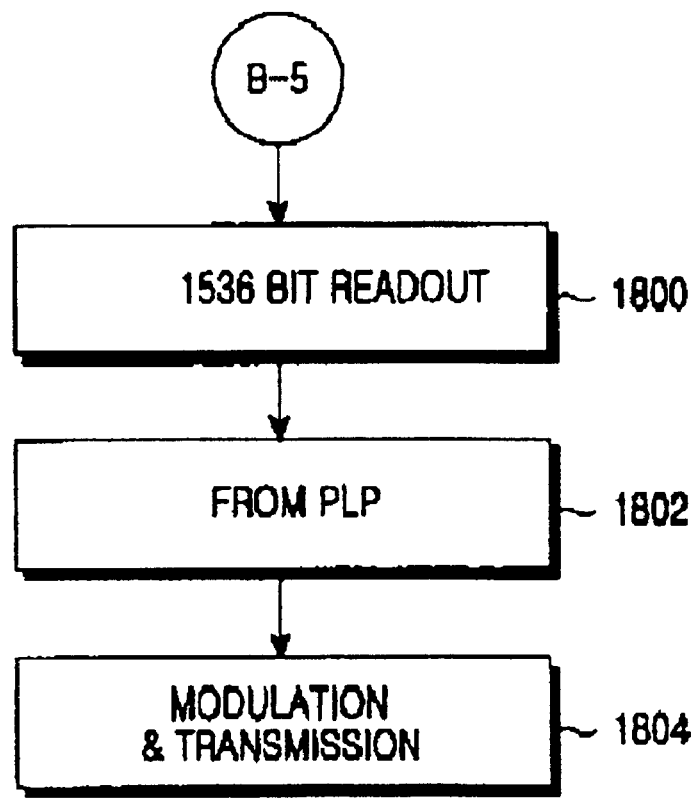

Referring to FIG. 6K, the base station reads 1536 bits from the L-priority buffer in step 1800, forms a PLP with the L-priority TU in step 1802, and modulates and transmits the PLP in step 1804.

Routines for the data rates determined in steps 410C to 410G in FIG. 4 can be performed in the same manner as the routines A and B.

Figure 7:
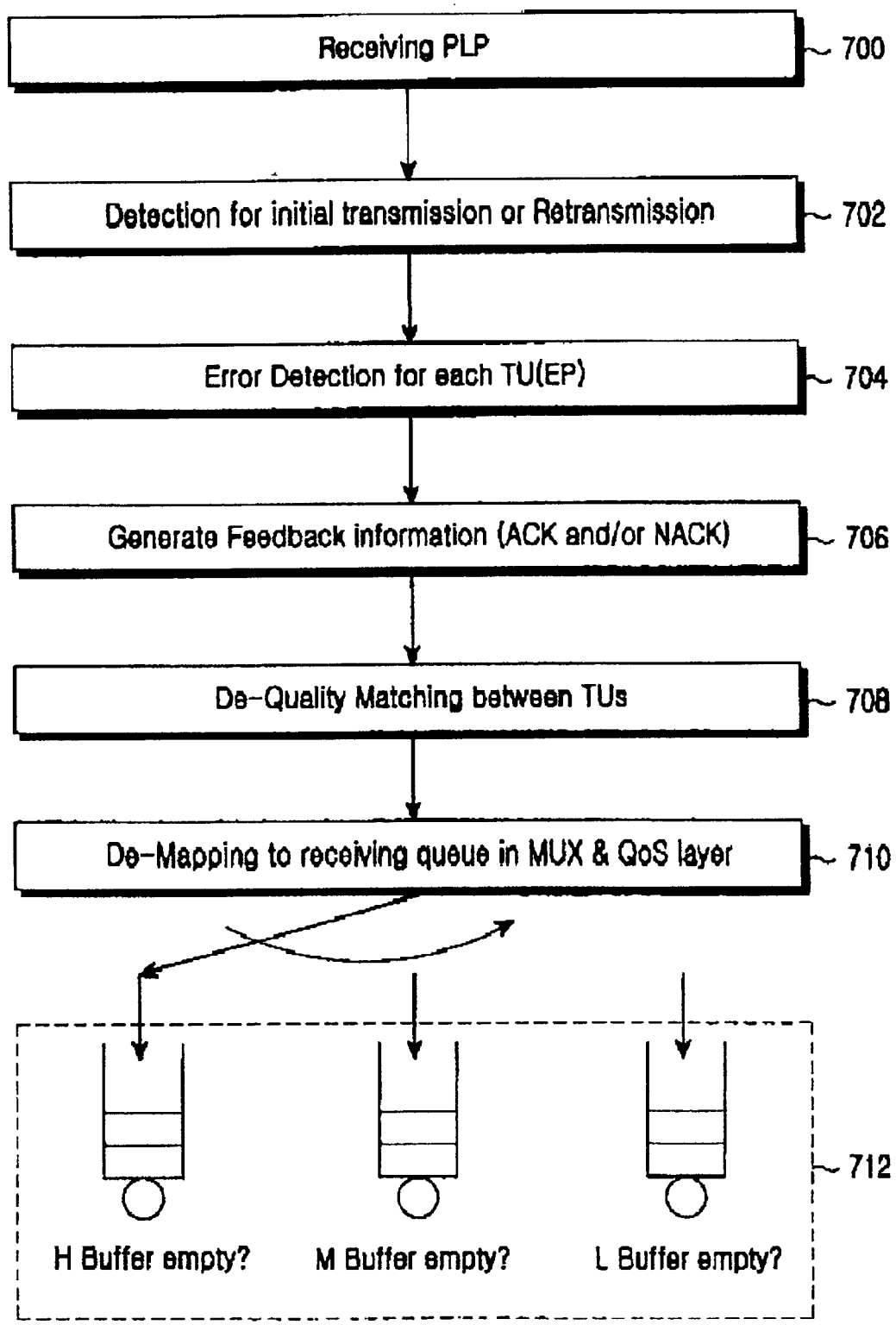
FIG. 7 is a block diagram of a receiver for receiving a PLP in an MS according to an embodiment of the present invention.

FIG. 7 is a block diagram of a receiver for receiving and processing a PLP according to the present invention. The following description is made with the appreciation that the receiver is in an MS.

Referring to FIG. 7, upon receipt of a PLP from the base station in step 700, the receiver determines whether the received PLP is an initial transmission or a retransmission in step 702. An initial transmission PLP and a retransmission PLP can be identified discriminately in many ways. The ID of an EP including the TUs of the PLP may be added to the preamble of the PLP, or transmitted on another channel in synchronization to the PLP. In the case of an initial transmission PLP, the PLP is CRC-checked in step 704. In the case of a retransmission PLP, the CRC check is performed in step 704 after the retransmission PLP is combined with its initially transmitted PLP.

Error detection and combining are carried out for a PLP in different manners depending on initial transmission or retransmission. At initial transmission, the MS analyses the ID of a received PLP and subjects the PLP to channel decoding without combining. Here, the received PLP before channel decoding is stored in a different buffer. If the PLP includes a single TU, one buffer is assigned. If the PLP includes two or more TUs, as many buffers as TUs are assigned. After decoding, each TU is CRC-checked. A buffer corresponding to an error-free TU is reset, while a buffer corresponding to an errored TU is kept. At retransmission, the initially transmitted PLP stored in a buffer is combined with the retransmission PLP on a TU basis. The combined TUs are stored in their respective buffers and then decoded. Similarly, a buffer corresponding to an error-free TU is reset, while a buffer corresponding to a TU with transmission errors is maintained.

In step 706, the base station generates a feedback frame with NACKs for errored TUs and ACKs for error-free TUs and transmits the feedback frame to the base station. The MS performs a de-quality matching (de-QM) operation on the error-free TUs. Since it is assumed that a one-to-one QM is applied to each of TUs in combination from at least two buffers in the base station, the MS does not perform an additional particular operation in the de-QM operation in FIG. 708. The MS feeds the TUs to buffers in a MUX & QoS sub-layer according to their priority levels in step 710. The TUs are de-mapped to their corresponding priority buffers in an RLP layer and then fed to a higher layer in step 712.

Figure 8:
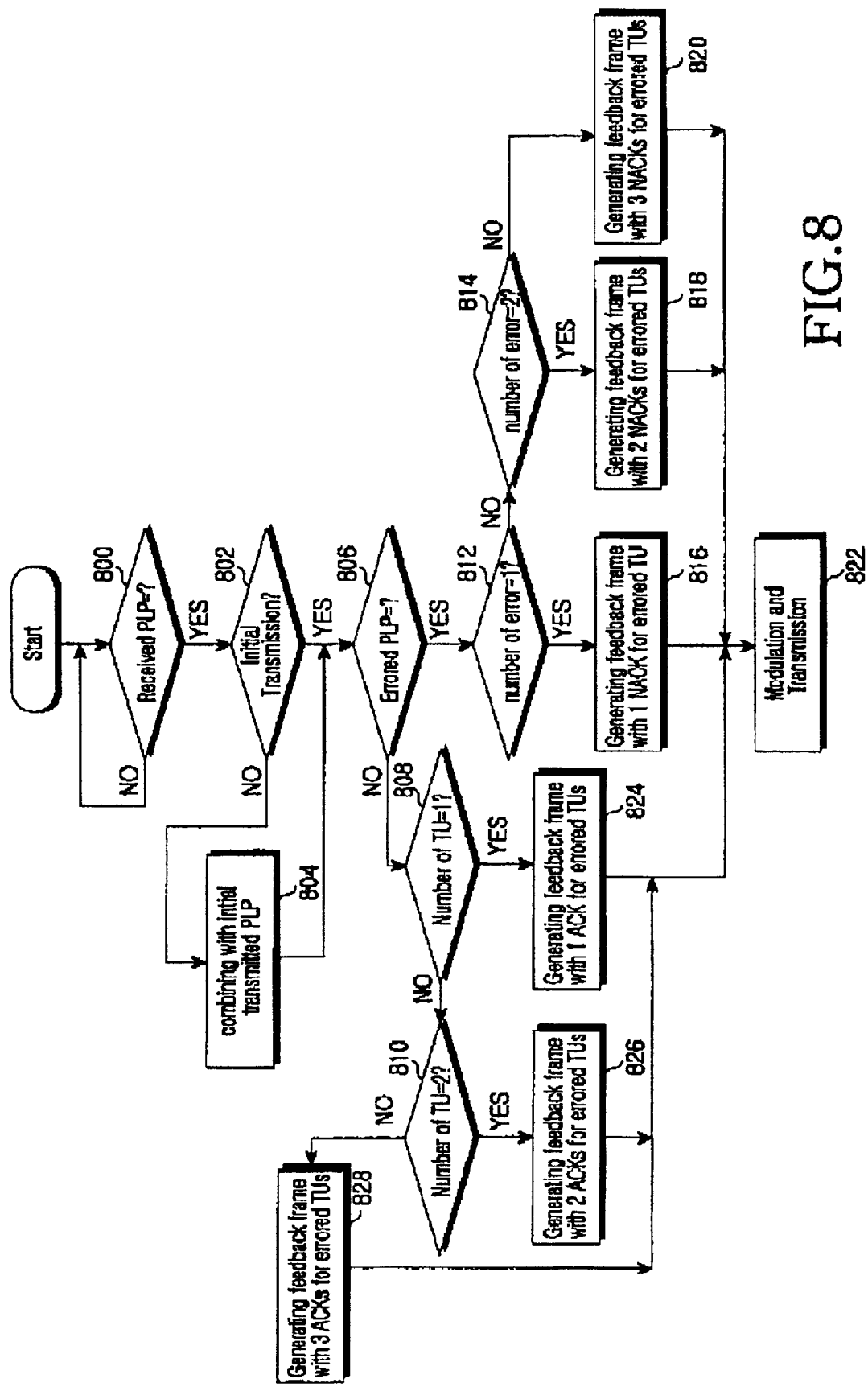
FIG. 8 is a flowchart illustrating an operation for processing TUs combined using multiple channels in the MS.

FIG. 8 is a flowchart illustrating processing TUs in combination on multiple channels in the MS.

Upon receipt of a PLP in step 800, the MS determines whether the received PLP is an initial transmission or a retransmission by checking its sequence number or its ID in its preamble or on another channel in step 802. If the received PLP is a retransmission one, the MS combines the received PLP with its initial transmission PLP previously received in the MS in step 804.

In step 806, the MS checks whether the received PLP or the combined PLP has errors by CRC check, for example. If the PLP has errors, the MS determines whether the PLP has a single errored TU in step 812. If one TU has errors, the MS generates a NACK signal for the errored TU in step 816 and transmits it to the base station in step 822. If two or more TUs have errors in step 812, the MS generates NACK signals for the errored TUs in steps 818 and 820 and then transmits them to the base station in step 822. Since one PLP may include up to three TUs in the embodiment of the present invention, a feedback frame includes up to three NACK signals for the TUs. If four or more TUs are transmitted in a PLP, the feedback frame includes as many ACK/NACK signals as the TU types.

If the PLP has no errors and includes one TU in step 806, the MS feeds back one ACK signal for the TU to the base station in step 824. If two or more TUs are in the PLP, the MS feeds back two or more ACK signals to the base station in step 826 or 828. That is, the MS transmits as many feedback signals as the number of TUs in the PLP. If three TUs are received in a PLP and two of them have errors, the MS feeds back two NACK signals and one ACK signal to the base station, with the NACK and ACK signals mapped to the IDs of their corresponding TUs.

Figure 9:
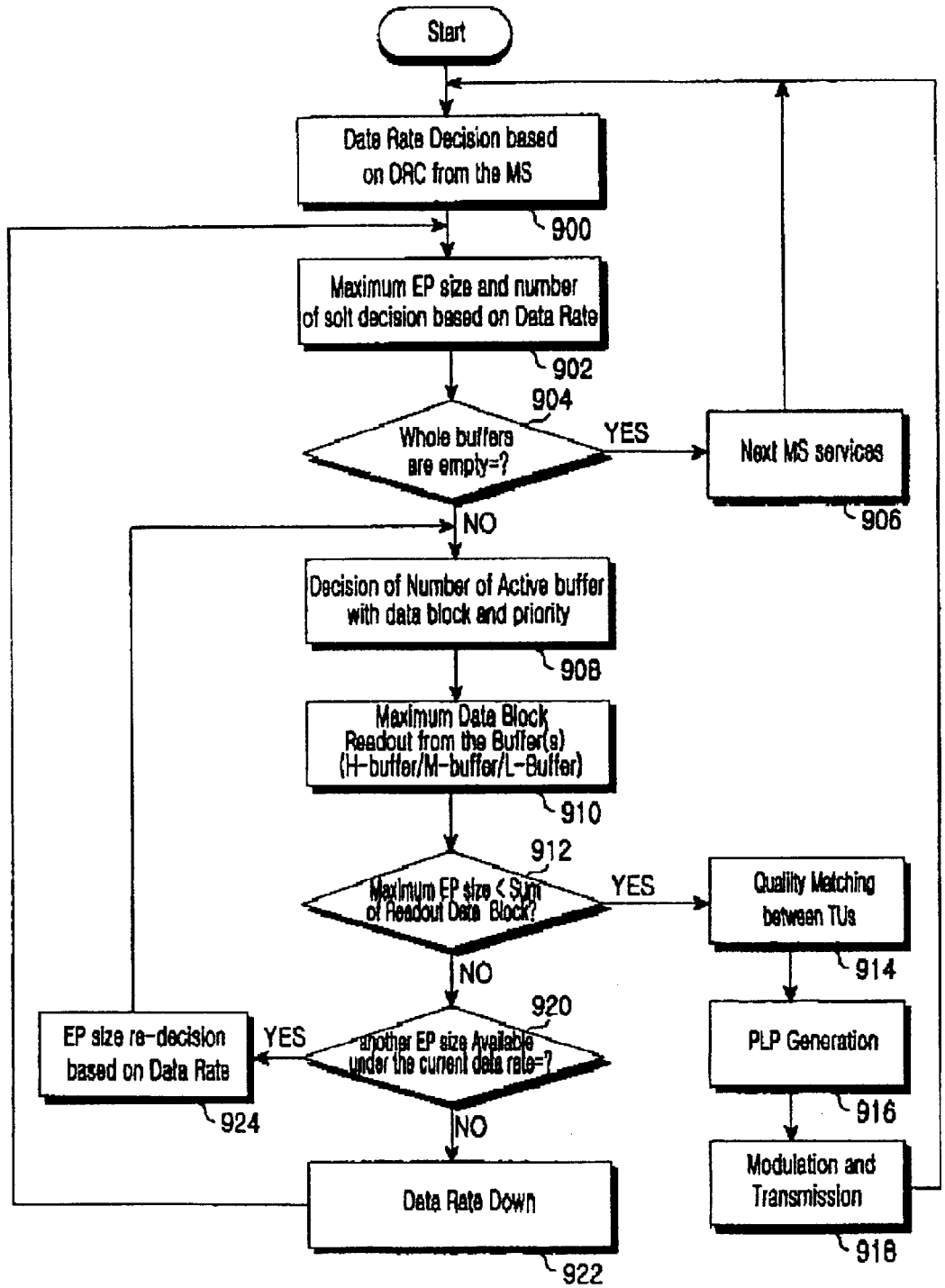
FIG. 9 is a flowchart illustrating a control operation for initial data transmission in the base station.

FIG. 9 is a flowchart illustrating a control operation for initial data transmission in the base station according to the present invention.

Referring to FIG. 9, the base station selects a forward data rate based on DRC information received from the MS among the data rates ranged from 38.4 Kbps to 2.4576 Mbps listed in Table 1 in step 900. According to the determined data rate, the base station determines an available maximum total TU size and the number of slots for transmission in step 902. The relation between the maximum total TU size and the number of slots is illustrated in Table 1.

For example, a maximum total TU size is 3072 bits and two slots are assigned for transmission at 1.2288 Mbps. In other words, 3072 bits are transmitted to the MS at 1.2288 Mbps, 1536 bits in each of two slots. In step 904, the base station checks transmission (Tx) buffers assigned to the MS. As stated before, data from three application service sources are stored in three buffers for each MS in the present invention. Therefore, the base station determines whether the three buffers are all empty. If the three buffers are all empty, which implies that there is no data to be transmitted, the base station is prepared to service the next data in step 906.

On the other hand, if at least one of the buffers is not empty in step 904, the base station determines the number of buffers having data and the priority levels of the buffers and then determines the sequence of reading out data from the buffers according to the priority levels in step 908. In step 910, the base station reads out data from the buffers to the maximum total TU size. The base station compares the maximum total TU size with the sum of the readout data in step 912. If the maximum total TU size is smaller than the sum of readout data, the base station goes to step 914 and otherwise, it goes to step 920.

In step 914, the base station performs quality matching on each of the TUs read out from the buffers. The base station forms a PLP with the quality-matched TUs in step 916, and modulates the PLP and transmits it to the MS in step 918.

On the other hand, if the maximum total TU size is greater than the sum of the readout data in step 912, the base station checks whether there is another total TU size available at the data rate in step 920. For example, if 3072 bits of TUs for 1.2288 Mbps cannot be read out from the buffers, TUs are recombined to former a 1536-bit EP. In this manner, the data size of a PLP is reset.

If it is impossible to provide the data rate even by changing the total TU size in step 920, the base station performs a DRD operation in step 922 and returns to step 902. If there is an available total TU size in step 920, the EP size is reset based on the data rate in step 924 and returns to step 908.

Table 2 illustrates read-out from the three buffers at 1.2288 Mbps in step 910.

TABLE 2

| Data rate: 1.2288 Mbps | | Buffer type | | |
|---|---|---|---|---|
| EP size | read-out combination index | H-priority buffer | M-priority buffer | L-priority buffer |
| 3072 bits (2 slot time) | 1 | 3072 | X | X |
| | 2 | X | 3072 | X |
| | 3 | X | X | 3072 |
| | 4 | 1536 | 1536 | X |
| | 5 | 1536 | X | 1536 |
| | 6 | X | 1536 | 1536 |
| | 7 | 768 | 768 | 1536 |
| | 8 | 768 | 1536 | 768 |
| | 9 | 1536 | 768 | 768 |
| 1536 bits (1 slot time) | 1 | 1536 | X | X |
| | 2 | X | 1536 | X |
| | 3 | X | X | 1536 |
| | 4 | 768 | 768 | X |
| | 5 | 768 | X | 768 |
| | 6 | X | 768 | 768 |
| | 7 | 384 | 384 | 768 |
| | 8 | 384 | 768 | 384 |
| | 9 | 768 | 384 | 384 |

There exist nine read-out cases under a maximum total TU size of 3072 bits at 1.2288 Mbps in step 910. If none of the nine cases are available, it is determined whether at least one of nine cases under a second maximum total TU size of 1536 bits is available. In the case where the readout data block cannot satisfy a changed total TU size in step 920, the DRD operation is performed.

As described above, the present invention advantageously provides a high throughput in high rate data transmission as well as in data transmission by scheduling in a protocol structure that supports data service and multimedia service effectively.

Now, there will be given a description of TU retransmission in the base station after feedback information for initially transmitted TUs is received according to the present invention. The TU retransmission will be described in the context of read-out scheduling in an AWGN channel with the same data rate for initial transmission and retransmission.

Retransmission

Data retransmission is scheduled by the Round-Robin scheduling. If a retransmission buffer has data, initial transmission is held and retransmission is carried out by the Round-Robin scheduling until the retransmission buffer is empty. In the embodiment of the present invention, it is assumed that a C/I is not changed, that is, the same data rate is used at initial transmission and retransmission on an AWGN channel. While the same data rate is ensured for the initial transmission and retransmission, a different total TU size can be adopted at retransmission.

Case I (38.4 Kbps): retransmission is carried out in the same manner as initial transmission.

Case II (76.8 Kbps)

(1) if one TU (384 bits or 768 bits) is initially transmitted in a PLP, retransmission is carried out in the same manner.

(2) if two TUs (384 bits+384 bits) are initially transmitted in a PLP, retransmission is considered in two ways:

a. if both TUs have errors, they are retransmitted in the same manner as in the initial transmission; and b. if one of the TUs has errors, the errored TU is retransmitted in four slots at 76.8 Kbps. As compared to the initial transmission, a PLP with a different size is retransmitted at the same data rate.

Case III (153.6 Kbps)

(1) if one TU (384, 768, or 1536 bits) is initially transmitted in a PLP, retransmission is carried out in the same manner.

(2) if two TUs (384+384 or 768+768) are initially transmitted in a PLP, retransmission is considered in two ways:

a. if both TUs have errors, they are retransmitted in the same manner as in the initial transmission; and b. if one of the TUs has errors, the errored TU is retransmitted in two or four slots at 153.6 Kbps.

(3) if three TUs (384+384+768 irrespective of order) are initially transmitted, retransmission is considered in three ways.

a. if the three TUs all have errors, retransmission is carried out in the same manner as the initial transmission;

b. if one of the three TUs has an error, the errored TU is retransmitted in two or four slots at 153.6 Kbps; and c. if two of the three buffers have errors, the errored TUs are retransmitted in a combination type indicated by (4), (5), or (6) in FIG. 3C when the sum of the errored TUs is 768 bits. When the sum of the errored TUs is 1152 bits (768+384), since 1152 bits is not a total TU size available at 153.6 Kbps, one of the errored TUs with a higher priority level is first retransmitted. If the higher priority TU is 768 bits, the 768 bit-TU is retransmitted in four slots at 153.6 Kbps. If the higher priority TU is 384 bits, the 384 bit-TU is first retransmitted in two slots at 153.6 Kbps. The remaining TU is retransmitted in the first place in the next scheduling. That is, the remaining TU is retransmitted in two or four slots at 153.6 Kbps in the next scheduling.

Case IV-1 (307.2 Kbps)

(1) if one TU (384, 768, 1536, 3072 bits) is initially transmitted in a PLP, retransmission is carried out in the same manner.

(2) if two TUs (384+384, 768+768, or 1536+1536) are initially transmitted in a PLP, retransmission is considered in two ways:

a. if both TUs have errors, they are retransmitted in the same manner as in the initial transmission; and b. if one of the TUs has an error, the errored TU is retransmitted in one, two or four slots at 307.2 Kbps.

(3) if three TUs (384+384+768 or 768+768+1536 irrespective of order) are initially transmitted, retransmission is considered in three ways.

a. if the three TUs all have errors, retransmission is carried out in the same manner as the initial transmission;

b. if one of the three TUs has an error, the errored TU is retransmitted in one, two or four slots at 307.2 Kbps; and c. if two of the three buffers have errors, the errored TUs are retransmitted in a combination type indicated by (4), (5), or (6) in FIG. 3D when the errored TUs is in the combination type of (384+384) or (768+768). When the errored TUs is in the combination type of (384+768 or 768+1536), since the sum 1152 or 2304 bits of the errored TUs is not a total TU size supported at 307.2 Kbps, one of the errored TUs with a higher priority level (384, 768 or 1536 bits) is first retransmitted. The remaining TU is retransmitted in the first place in the next scheduling.

Case IV-2 (614.4 Kbps)

(1) if one TU (768, 1536, or 3072 bits) is initially transmitted in a PLP, retransmission is carried out in the same manner.

(2) if two TUs (384+384, 768+768, or 1536+1536) are initially transmitted in a PLP, retransmission is considered in two ways:

a. if both TUs have errors, they are retransmitted in the same manner as in the initial transmission; and b. if one of the TUs has an error, the errored TU is retransmitted in one or two slots at 614.4 Kbps except a 384-bit TU. Since 384 bits is not an available total TU size at 614.4 Kbps, the 384-bit TU is retransmitted by DRD.

(3) if three TUs (384+384+768 or 768+768+1536 irrespective of order) are initially transmitted, retransmission is considered in three ways.

a. if the three TUs all have errors, retransmission is carried out in the same manner as the initial transmission;

b. if one of the three TUs has an error, the errored TU is retransmitted in one or two slots at 614.4 Kbps except a 384-bit TU. Since 384 bits is not an available total TU size at 614.4 Kbps, the 384-bit TU is retransmitted by DRD; and c. if two of the three buffers have errors, the errored TUs are retransmitted in a combination type indicated by (4), (5), or (6) in FIG. 3D when the errored TUs are in the combination type of (384+384) or (768+768). When the errored TUs are in the combination type of (384+768) or (768+1536), a higher priority 768-bit or 1536-bit TU is retransmitted in one or two slots at 614.4 Kbps. If the higher priority TU is 384 bits, it is retransmitted by DRD since 384 bits is not an available total TU size at 614.4 Kbps. The remaining TU is retransmitted in the first place in the next scheduling.

Case IV-3 (1228.8 Kbps)

(1) if one TU (1536 or 3072 bits) is initially transmitted in a PLP, retransmission is carried out in the same manner.

(2) if two TUs (768+768 or 1536+1536) are initially transmitted in a PLP, retransmission is considered in two ways:

a. if both TUs have errors, they are retransmitted in the same manner as in the initial transmission; and b. if one of the TUs has an error and the errored TU is 1536 bits, it is retransmitted in one slot at 1228.8. Kbps. If the errored TU is 768 bits, it is retransmitted by DRD since 768 bits is not an available total TU size at 1228.8 Kbps.

(3) if three TUs (384+384+768 or 768+768+1536 irrespective of order) are initially transmitted, retransmission is considered in three ways.

a. if the three TUs all have errors, retransmission is carried out in the same manner as the initial transmission;

b. if one of the TUs has an error and the errored TU is 1536 bits, it is retransmitted in one slot at 1228.8. Kbps. If the errored TU is 384 or 768 bits, it is retransmitted by DRD since 384 and 768 bits is not available total TU sizes at 1228.8 Kbps; and c. if two of the three buffers have errors, the errored TUs are retransmitted in one slot in a combination type indicated by (4), (5), or (6) in FIG. 3D when the errored TUs is in the combination type of (768+768). However, when the errored TUs are in the combination type of (384+384), they are retransmitted by DRD since 768 bits is not an available total TU size at 1228.8 Kbps. If the errored TUs are in the combination type of (384+768) or (768+1536), a higher priority 1536-bit TU is retransmitted in one slot at 1228.8 Kbps. If the higher priority TU is 384 or 768 bits, it is retransmitted by DRD. The remaining TU is retransmitted in the first place in the next scheduling.

Case IV-4 (2457.6 Kbps)

(1) if one TU (3072 bits) is initially transmitted in a PLP, retransmission is carried out in the same manner.

(2) if two TUs (536+1536) are initially transmitted in a PLP, retransmission is considered in two ways:

a. if both TUs have errors, they are retransmitted in the same manner as in the initial transmission; and b. if one of the TUs has an error, the errored 1536-bit TU is retransmitted by DRD since 1536 bits is not an available total TU size at 2457.6 Kbps.

(3) if three TUs (768+768+1536 irrespective of order) are initially transmitted, retransmission is considered in three ways.

a. if the three TUs all have errors, retransmission is carried out in the same manner as the initial transmission;

b. if one of the TUs has an error and the errored 768-bit or 1536-bit TU is retransmitted by DRD since 768 bits and 1536 bits are not available total TU sizes at 2457.6 Kbps; and c. if two of the three buffers have errors, the errored TUs are retransmitted by DRD since 768 bits and 1536 bits are not available total TU sizes at 2457.6 Kbps. The remaining TU is retransmitted in the first place in the next scheduling.

Figure 10:
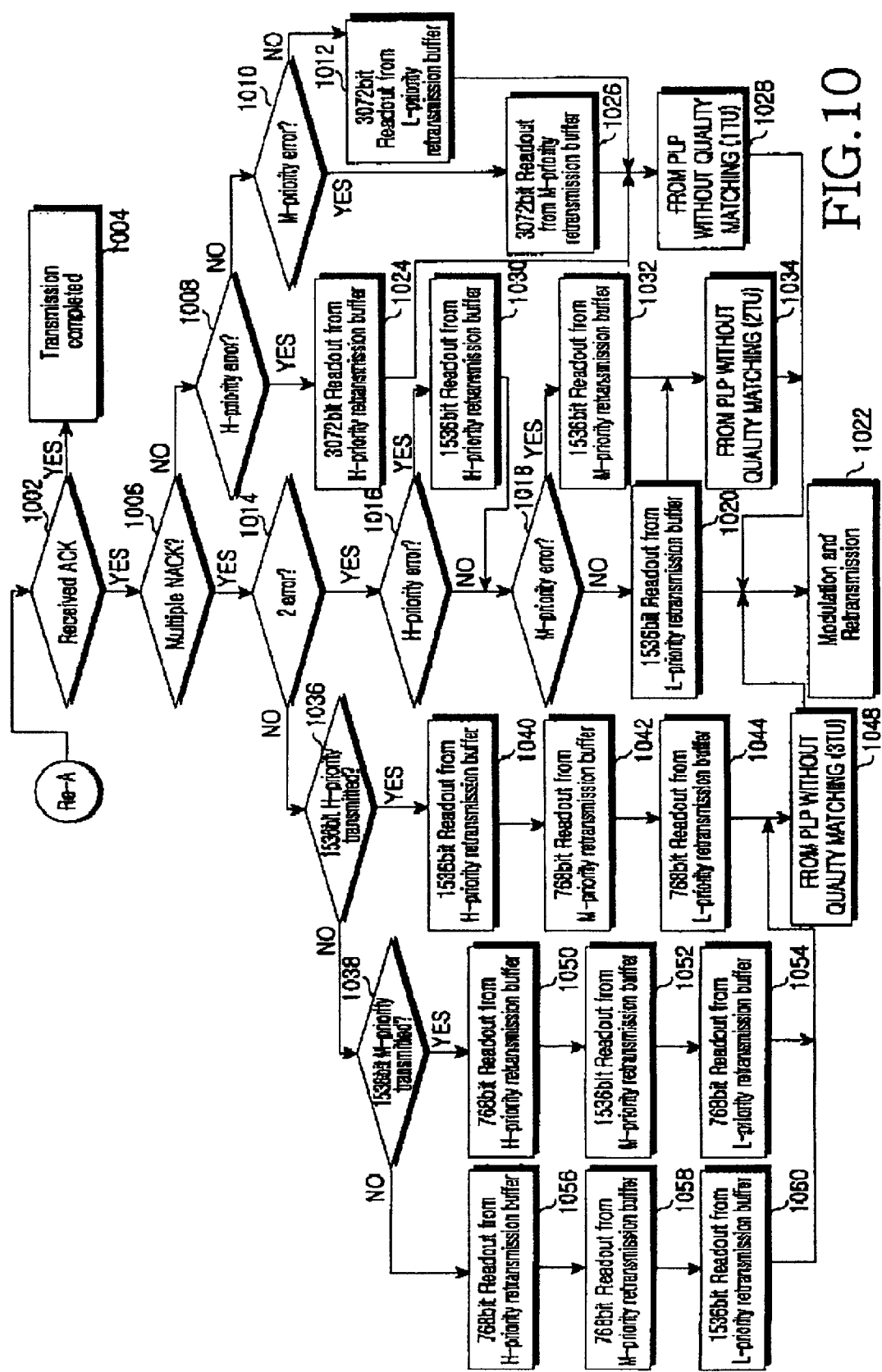
FIG. 10 is a flowchart illustrating data retransmission at 2.4576 Mbps in the base station when the TU or TUs of a PLP all fail at initial transmission according to an embodiment of the present invention.

FIG. 10 is a flowchart illustrating data retransmission at 2.4576 Mbps on an AWGN channel by the Round-Robin scheduling when the TU or TUs included in an initially transmitted PLP all fail in reception according to the embodiment of the present invention.

Referring to FIG. 10, the base station receives a feedback from for an initially transmitted PLP from the mobile station in step 1000. The base station determines whether the feedback frame has only ACK signals for the TUs of the initially transmitted PLP in step 1002. If the feedback frame has ACKs for the TUs of the PLP, the base station determines that the transmission has been completed without errors in step 1004.

If the feedback frame includes at least one NACK signal, the base station determines whether the number of NACKs in the feedback frame is at least two, that is, whether the initially transmitted PLP frame has only one TU in step 1006. If the PLP includes only one TU, the base station determines whether the errored TU is from the H-priority buffer in step 1008. If the errored TU is from the H-priority buffer, the base station reads out 3072 bits from an H retransmission buffer in step 1024, forms a PLP with the 3072-bit H-priority TU in step 1028, and retransmits it in step 1022. If the errored TU is not from the H-priority buffer in step 1008, the base station determines whether it is from the M-priority buffer in step 1010. If the errored TU is from the M-priority buffer, the base station reads out 3072 bits from an M retransmission buffer in step 1026, forms a PLP with the 3072-bit M-priority TU in step 1028, and retransmits it in step 1022. If the errored TU is not from the M-priority buffer in step 1010, the base station reads out 3072 bits from an L retransmission buffer in step 1012, forms a PLP with the 3072-bit L-priority TU in step 1028, and retransmits it in step 1022.

Meanwhile, if the sum of NACKs is at least two in step 1006, the base station determines whether the feedback frame has two NACKs in step 1014. In the case of two NACKs, i.e., two TUs in the PLP, the base station goes to step 1016 and in the case of more NACKs, i.e., more TUs in the PLP, it goes to step 1036.

If the base station determines that one of the two errored TUs is from the H-priority buffer in step 1016, it reads out 1536 bits from the H retransmission buffer in step 1030 and proceeds to step 1018. On the other hand, if either of the errored TUs is not from the H-priority buffer in step 1016, the base station determines whether one of the errored TUs is from the M-priority buffer in step 1018. If one of the errored TUs is from the M-priority buffer, the base station reads out 1536 bits from the M retransmission buffer in step 1032, forms a PLP using the two 1532-bit TUs from the H and M retransmission buffers in step 1034, and transmits the PLP to the MS in step 1022. If either of the errored TUs is not from the M-priority buffer, the base station reads out 1536 bits from the L retransmission buffer in step 1020 and then performs steps 1034 and 1022. In steps 1016 through 1034, 1536 bits are read out from each of two of the three buffers. That is, H-priority 1536 bits and M-priority 1536 bits, H-priority 1536 bits and L-priority 1536 bits, or M-priority 1536 bits and L-priority 1536 bits are read out and then form a PLP using the readout two 1536-bit TUs.

If the feedback frame includes more than two NACKs in step 1014, this implies that the PLP includes three TUs since it is assumed that a PLP can have up to three TUs in the embodiment of the present invention. If it is determined that the initially transmitted PLP has 1536 bits from the H-priority buffer in step 1036, the base station reads out 1536 bits from the H retransmission buffer in step 1040. Then, the base station reads out 768 bits from the M retransmission buffer in step 1042 and 768 bits from the L-priority buffer in step 1044. The base station forms a PLP with the three TUs in step 1048 and transmits the PLP to the MS in step 1022.

On the other hand, if it is determined that the H-priority TU is not 1536 bits in the initially transmitted PLP in step 1036, the base station determines whether the PLP includes 1536 bits from the M-priority buffer in step 1038. If the M-priority TU is 1536 bits, the base station reads out 768 bits from the H retransmission buffer in step 1050, 1536 bits from the M retransmission buffer in step 1052, and 768 bits from the L retransmission buffer in step 1054. The base station forms a PLP with the three TUs in step 1048 and retransmits the PLP to the MS in step 1022.

If the M-priority TU is not 1536 bits in step 1038, this implies that 1536 bits are from the L-priority buffer. Therefore, the base station reads out 768 bits from the H retransmission buffer in step 1056, 768 bits from the M retransmission buffer in step 1058, and 1536 bits from the L retransmission buffer in step 1060. The base station forms a PLP with the three TUs in step 1048 and retransmits the PLP to the MS in step 1022.

FIGS. 11A to 11D are flowcharts illustrating data retransmission at 2.4576 Mbps when one or two of three TUs in an initially transmitted PLP are failed in reception according to the embodiment of the present invention.

Figure 11A:
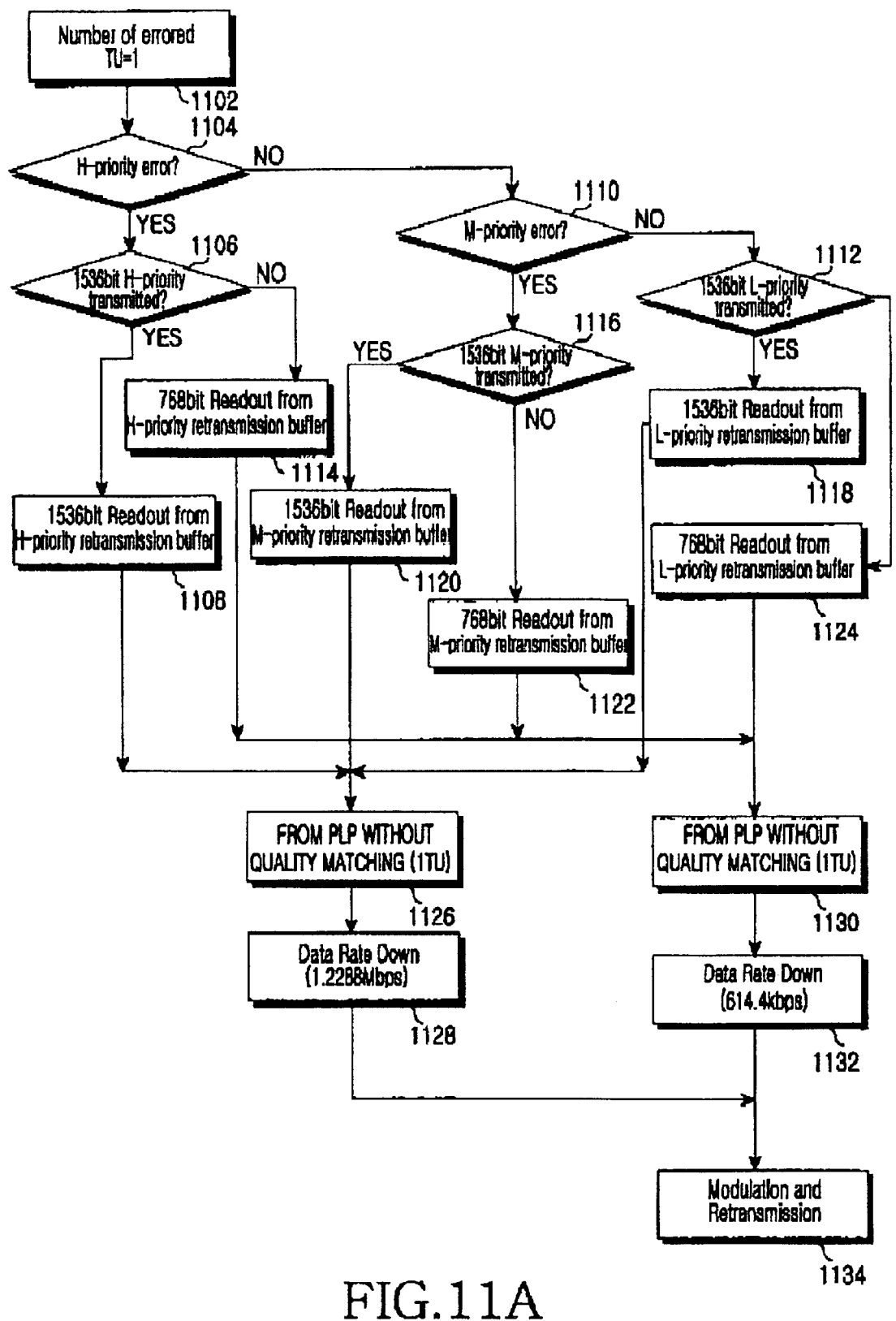
FIGS. 11A–11D are flowcharts illustrating data retransmission at 2.4576 Mbps in the base station when a PLP that includes three types of TUs, and one or two types of TUs among the three types of TUs fail at initial transmission according to an embodiment of the present invention.

Referring to FIG. 11A, the base station determines that one of the three TUs in the PLP has an error in step 1102. In step 1104, the base station determines whether the errored TU is from the H-priority buffer. If the errored TU is from the H-priority buffer, the base station determines whether the H-priority priority TU in the PLP is 1536 bits in step 1106. If the H-priority TU is 1536 bits, the base station reads out 1536 bits from the H retransmission buffer in step 1108 and forms a PLP with the 1536-bit H-priority TU in step 1126. However, since 1536 bits is not an available total TU size at 2.4576 Mbps, the base station performs a DRD operation in step 1128 and then retransmits the resulting PLP to the MS in step 1134. Since 1.2288 Mbps is a maximum data rate at which the 1536-bit data can be transmitted, 2.4576 Mbps is decreased to 1.2288 Mbps in step 1128. On the other hand, if the H-priority TU is not 1536 bits in step 1106, this implies that it is 768 bits. Thus, the base station reads out 768 bits from the H retransmission buffer in step 1114 and then forms a PLP with the 768-bit H-priority TU in step 1130. However, since 768 bits is not a total TU size available at 2.4576 Mbps, the base station performs a DRD operation by decreasing 2.4576 Mbps to a maximum data rate that allows transmission of 768 bits, i.e., 614.4 Kbps in step 1132.

If it is determined that the errored TU is not from the H-priority buffer in step 1104, the base station determines whether the errored TU is from the M-priority priority buffer in step 1110. If the errored TU is from the M-priority buffer, the base station determines whether the M-priority TU is 1536 bits in step 1116. If the M-priority TU is 1536 bits, the base station reads out 1536 bits from the M retransmission buffer in step 1120 and forms a PLP with the 1536-bit M-priority TU in step 1126. However, since 1536 bits is not an available total TU size at 2.4576 Mbps, the base station performs a DRD operation by decreasing 2.4576 Mbps to 1.2288 Mbps in step 1128 and then retransmits the resulting PLP to the MS in step 1134. If the M-priority TU is not 1536 bits in step 1116, the base station reads out 768 bits from the M retransmission buffer in step 1122 and then forms a PLP with the 768-bit M-priority ml in step 1130. However, since 768 bits is not a total mU size available at 2.4576 Mbps, the base station performs a DRD operation by decreasing 2.4576 Mbps to 614.4 Kbps in step 1132.

If it is determined that the errored TU is not from the M-priority buffer in step 1110, this implies that the errored TU is from the L-priority buffer. In the same manner as the H-priority or M-priority TU retransmission, the L-priority TU is retransmitted in steps 1124 to 1134 if the L-priority TU is 768 bits and in steps 1126, 1128 and 1134 if the L-priority TU is 1536 bits.

Figure 11B:
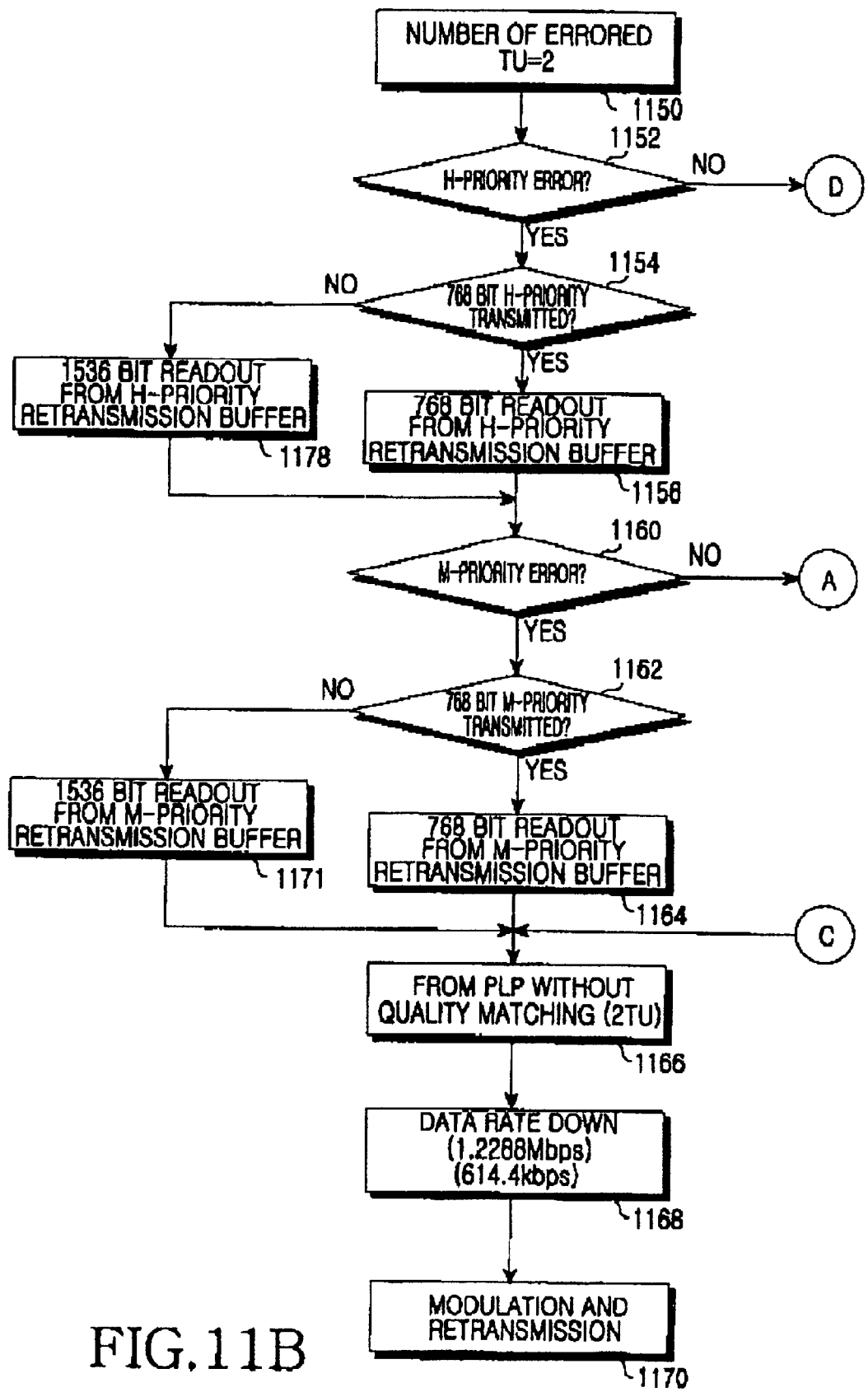

Referring to FIG. 11B, the base station determines that two of the three TUs in the PLP has errors in step 1150. In step 1152, the base station determines whether one of the errored TUs is from the H-priority buffer. If one of the errored TUs is from the H-priority buffer, the base station goes to step 1154 and otherwise, it performs a routine D. The base station determines whether the H-priority TU is 768 bits in step 1154. If the H-priority TU is 768 bits, it goes to step 1156 and otherwise, it goes to step 1178. The base station reads out 768 bits from the H retransmission buffer in step 1156. In step 1178, the base station reads out 1536 bits from the H retransmission buffer.

As described before, the PLP size is limited to 3072 bits at 2.5467 Mbps. Therefore, to read out from 3072 bits from the three buffers, 768 bits should be read out from each of two buffers and 1532 bits from the other buffer. Each of the H-, M- and L-priority TUs is 768 or 1532 bits. If the errored H-priority TU is not 768 bits in step 1154, this implies that the H-priority TU is 1536 bits. Thus, the base station reads out 1532 bits from the H retransmission buffer in step 1178.

Figure 11C:
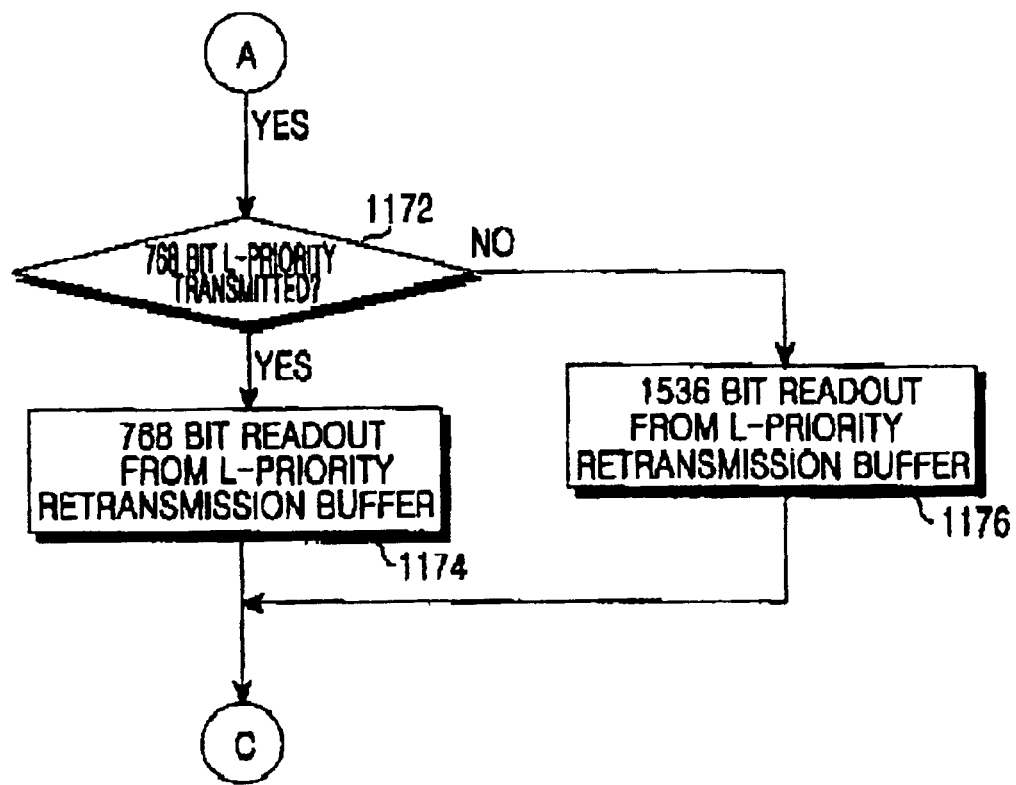
Figure 11D:
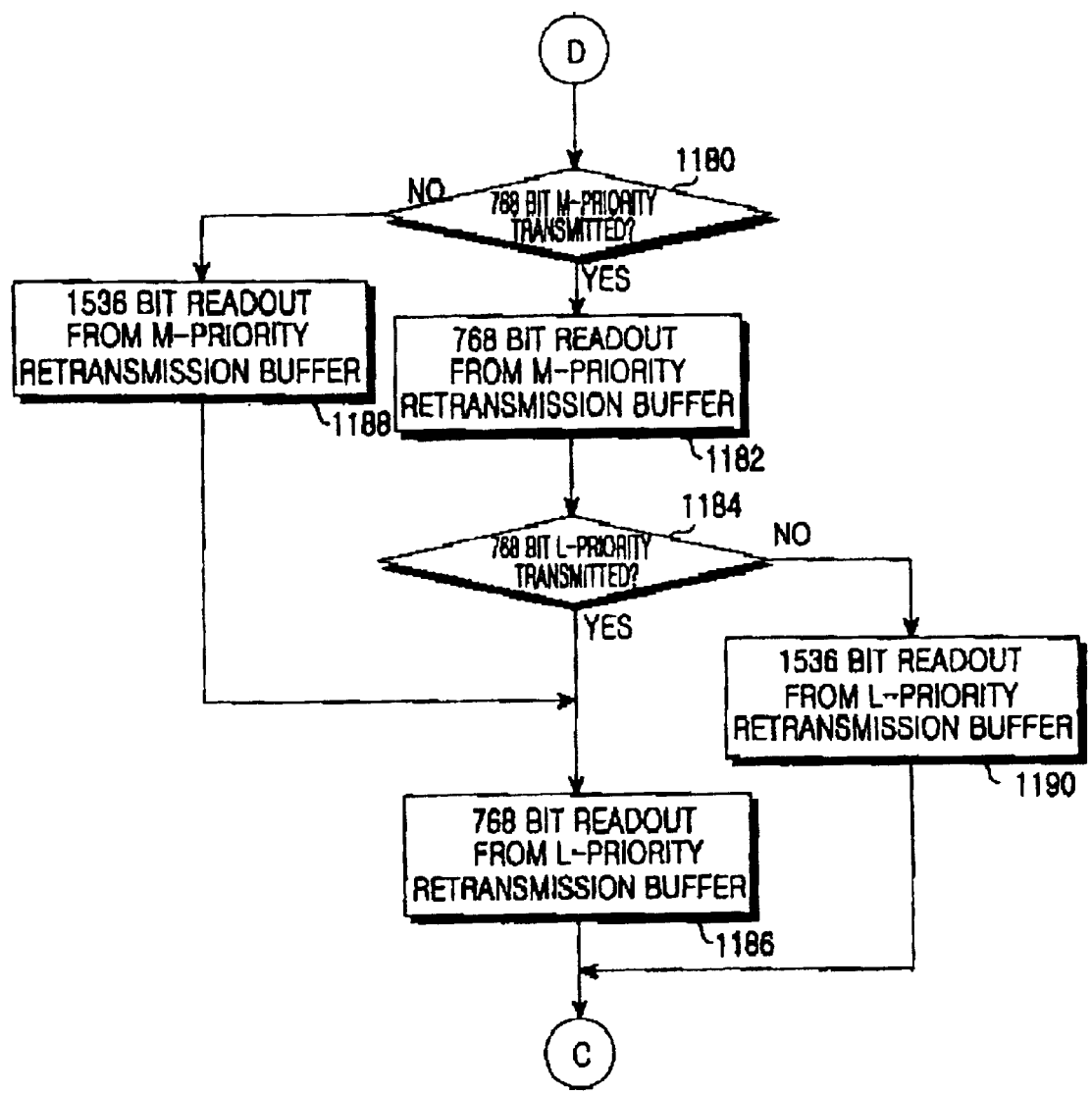

Then, the base station should read out from one of the other buffers because two TUs are errored in the PLP in this case depicted in FIGS. 11B, 11C and 11D. Then it is determined whether there is an M-priority error in step 1160. If there is an M-priority error, the base station goes to step 1162 and otherwise, it performs a routine A. The base station determines whether the M-priority TU is 768 bits in step 1162. If it is, the base station reads out 768 bits from the M retransmission buffer in step 1164. On the other hand, if the M-priority error is not 768 bits, the base station reads out 1532 bits from the M retransmission buffer in step 1171.

After step 1164 or 1171, the base station forms a PLP with the read out data without quality matching in step 1166. If the sum of the readout TUs is 2304 bits, the PLP is formed with a higher-priority 768-bit or 1532-bit TU. If the sum of the TUs is 1532 bits, the PLP is formed with the 768-bit TUs.

The base station performs a DRD operation by decreasing 2.5467 Mbps to 1.2288 Mbps or 614.4 Kbps because 2304 bits and 1532 bits are not available total TU size at 2.5467 Mbps. In step 1170, the base station modulates the PLP and transmits it to the mobile station.

In the case where there is an H-priority error and no M-priority error, which implies that there is an L-priority error, the routine A is performed. Referring to FIG. 11C, the base station determines whether the L-priority TU is 768 bits in step 1172. If it is, the base station reads out 768 bits from the L retransmission buffer in step 1174. If the M-priority TU is not 768 bits, the base station reads out 1536 bits in step 1176. After step 11774 or 1176, the base station returns to step 1166.

When there is no H-priority error in step 1152, the routine D is performed. In this case, there are an M-priority error and an L-priority error. The base station determines whether the M-priority TU is 768 bits in step 1180. If it is, the base station reads out 768 bits from the M retransmission buffer in step 1182 and determines whether the L-priority TU is 768 bits in step 1184. If the L-priority TU is 768 bits, the base station reads out 768 bits from the L retransmission buffer in step 1186. On the other hand, if the M-priority TU is not 768 bits, the base station reads out 1536 bits from the M retransmission buffer in step 1188 and goes to step 1186 because if one of three TUs having 3072 bits in total is 1536 bits, each of the other TUs is 768 bits.

Meanwhile, if the L-priority TU is not 768 bits in step 1184, the base station reads out 1536 bits from the L retransmission buffer in step 1190. After step 1186 or 1190, the base station returns to step 1166.

In accordance with the present invention as described above, a high throughput is provided for high rate data transmission as well as data transmission by scheduling in a protocol structure that supports multimedia service as well as data service.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of transmitting different types of service data to a mobile station from a transmitter of a base station, comprising the steps of:

determining a data size available at a predetermined data rate; and constructing transmission data in the available data size by combining one or more types of service data among the different types of service data according to priority levels of the different types of service data.

2. The method of claim 1, further comprising the step of constructing transmission data in a second data size available at the determined data rate if the size of the combined service data is less than the available data size.

3. The method of claim 2, further comprising the steps of selecting a maximum data rate less than the data rate and constructing transmission data in a data size available at the selected data rate by combining one or more types of service data, if the size of the combined service data does not satisfy any of data sizes available at the predetermined data rate.

4. The method of claim 1, further comprising the step of selecting a mobile station to be serviced by Round-Robin scheduling if the base station services at least two different mobile stations.

5. The method of claim 1, wherein the predetermined data rate is determined from DRC (Data Rate Control) information received from the mobile station in the base station.

6. The method of claim 1, wherein the service data with the highest priority level is excluded from the transmission data construction if the amount of the service data with the highest priority level cannot be supported in combination with service data with a lower priority level at the predetermined data rate and the amount of service data at other priority levels can be supported at the data rate.

7. The method of claim 1, further comprising the step of constructing transmission data in an available data size less than the available data size by combining one or more types of service data if the size of the combined data is less than the maximum available data size.

8. A base station device for transmitting different types of service data to a mobile station, comprising:

a transmitter for determining a data size available at a predetermined data rate, and constructing transmission data in the available data size by combining one or more types of service data among the different types of service data according to priority levels of the different types of service data.

9. The base station device of claim 8, wherein if the base station services at least two different mobile stations, the base station selects a mobile station to be serviced by Robin-Round scheduling.

10. A method of retransmitting to a mobile station service data containing errors, comprising the steps of:

determining a data size available at a predetermined data rate;

determining whether the size of the service data containing errors is equal to the available data size; and retransmitting the service data containing errors at the predetermined data rate if the size of the service data containing errors is equal to the available data size.

11. The method of claim 10, further comprising the step of retransmitting service data containing errors at the determined data rate by combining two or more service data blocks having errors if the sum of the two or more service data blocks having errors is equal to the available data size.

12. The method of claim 11, wherein if the sum of the two or more service data blocks having errors is not equal to any of data sizes available at the predetermined data rate, service data are retransmitted according to priority levels of the service data.

13. The method of claim 12, wherein service data that is excluded from retransmission according to the priority level of the service data is retransmitted with priority at a next scheduling.

14. The method of claim 10, further comprising the step of retransmitting at least two types of service data according to priority levels of the two types of service data if the at least two types of service data have errors and the sum of the at least two types of service data having errors is not equal to the available data size.

15. The method of claim 10, further comprising the step of constructing retransmission data in a second available size by combining the service data having errors, if the sum of the service data having errors is not equal to the available data size.

16. The method of claim 14, further comprising the step of retransmitting the at least two types of service data having errors in combination at a maximum data rate less than the determined data rate if the at least two types of service data in combination is not equal to any of data sizes available at the data rate.

17. The method of claim 14, further comprising the step of separately retransmitting the at least two types of service data having errors at a maximum data rate less than the delivered data rate if the at least two types of service data is not equal to any of data sizes available at the data rate.

18. The method of claim 10, further comprising the step of selecting a mobile station to be serviced by Round-Robin scheduling if there are at least two mobile stations to be serviced.

19. The method of claim 10, wherein if retransmission data and initial transmission data is to be transmitted to the mobile station, the retransmission data is transmitted before the initial transmission data.

20. The method of claim 10, wherein the predetermined data rate is determined from DRC (Data Rate Control) information received from the mobile station.

21. A base station device for retransmitting service data having errors to a mobile station comprising:

a transmitter for determining a maximum data size available at a data rate determined from DRC (Data Rate Control) information received from the mobile station, and retransmitting the service data having errors at the data rate if the size of the service data having errors is equal to the maximum available data size.

22. A method of receiving in a mobile station different types of service data transmitted from a base station, comprising the steps of:

determining whether the received service data is initially transmitted or retransmitted service data;

detecting errors from the received service data and generating feedback information indicating an error detection result for the received service data, if the received service data is initially transmitted; and separately storing the service data according to the QoS of the service data.

23. The method of claim 21, wherein the feedback information indicates whether the service data has an error or not.

24. The method of claim 21, wherein if the received service data is retransmitted, the received service data is combined with initially transmitted service data and the combined service data is error-checked.

25. A receiver in a mobile station for receiving different types of service data from a base station, comprising:

a determiner for determining whether the received service data is initially transmitted or retransmitted service data;

an error detector for detecting errors from the received service data;

a feedback information generator for generating feedback information indicating an error detection result for the received service data, if the received service data is initially transmitted; and a quality demultiplexer and storage for separately storing the service data according to the QoS of the service data.

* * * * *